(12) United States Patent
Hayashi

(10) Patent No.: US 7,515,711 B2
(45) Date of Patent: Apr. 7, 2009

(54) METHODS AND APPARATUSES FOR ENCRYPTING VIDEO AND FOR DECRYPTING VIDEO

(75) Inventor: Junichi Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 10/877,665

(22) Filed: Jun. 25, 2004

(65) Prior Publication Data

US 2005/0018844 A1  Jan. 27, 2005

(30) Foreign Application Priority Data

Jul. 1, 2003  (JP)  ............... 2003-189604

(51) Int. Cl.
*H04N 7/167* (2006.01)
(52) U.S. Cl. .............. 380/217; 380/269; 704/503; 704/504; 708/203; 382/100; 382/232; 382/233; 382/240; 382/243; 382/244
(58) Field of Classification Search ........... 380/217, 380/269, 271; 704/503, 504; 708/203; 382/100, 382/232, 233, 235, 240, 243, 244
See application file for complete search history.

(56) References Cited

U.S. PATENT DOCUMENTS 5,872,845 A * 2/1999 Feder ................ 358/442

6,236,727 B1  5/2001 Ciacelli et al.
2003/0202697 A1* 10/2003 Simard et al. ............... 382/195

FOREIGN PATENT DOCUMENTS

| JP | 2000124894 A | 4/2000 |
|---|---|---|
| JP | 200151411 A | 5/2000 |
| JP | 2003016040 A | 1/2003 |
| JP | 2003189086 A | 7/2003 |
| JP | 2004236231 A | 8/2004 |

OTHER PUBLICATIONS

JPEG 2000 http://www.jpeg.org/jpeg2000/index.html.

* cited by examiner

*Primary Examiner*—Kimyen Vu
*Assistant Examiner*—Baotran N To
(74) *Attorney, Agent, or Firm*—Canon U.S.A. Inc., I.P. Division

(57) ABSTRACT

An encryption technique and a decryption technique that are applied to video data that is encrypted on a predetermined domain of compressed video data are disclosed. For example, JPEG2000 compressed video data can be compressed using a wavelet conversion. Compressed video data is input. The input video data is decompressed to a predetermined domain of the compression process, and the decompressed video data is then encrypted. The encrypted video data is then compressed in accordance with the decompression process, and information representing the encrypted compression domain is stored in a predetermined area of the compressed video data.

7 Claims, 29 Drawing Sheets

METHODS AND APPARATUSES FOR ENCRYPTING VIDEO AND FOR DECRYPTING VIDEO

CROSS REFERENCE TO RELATED APPLICATIONS

This application claims the benefit of Japanese Application 2003-189604, filed Jul. 1, 2003, the entire contents of which are incorporated herein by reference.

BACKGROUND OF THE INVENTION

1. Field of the Invention

The present invention relates to a technique for encrypting and decrypting video data.

2. Description of the Related Art

Techniques are available to encrypt or scramble video data to control accessibility to the video data. In accordance with such a technique, the video data is encrypted using encryption key information, and only users who have decryption key information corresponding to the encryption key information are able to correctly replay the video data.

Since the amount of information of video data is typically large, compression encoding is typically used. For example, Standard JPEG2000, standardized by ISO/IEC JTC 1/SC 29/WG1, is typically used as a compression technique. Encryption may be applied to video data that has been compressed using the JPEG2000 Standard. The video data is thus efficiently transferred and stored, and access to the video data is also controlled.

Using a compression technique such as JPEG2000, the video data is compressed in a hierarchical structure in terms of resolution, video quality, spatial domain, and components forming pixels. If the video data is encrypted in accordance with the hierarchical structure, access control may be performed taking into consideration the hierarchical structure.

If access control is performed on a per resolution basis so that a high-resolution component can only be encrypted with a low-resolution component left unencrypted, any user can replay the low-resolution video data. The high-resolution component can only be correctly replayed by a user who is permitted to use a decryption key (the owner of a decryption key).

Encryption in an encoding (compression) domain is possible when video data such as the one compressed in accordance with the JPEG2000 Standard is encrypted.

In accordance with one of those techniques, an encryption process is performed on a coefficient of video data subsequent to quantization in a JPEG2000 compression process (or code bit plane of the coefficient), and the encrypted quantization coefficient is entropy encoded. Encrypted compressed data thus results (a first encryption method). This encryption method allows the encryption process to be performed in the middle of the compression process if the video data needs to be compressed and encrypted. The first encryption method reduces the entire process time, thereby efficiently encrypting the video data. The video data that has been encrypted using the first encryption method is compatible with the JPEG2000 Standard.

In accordance with another technique, an encryption process is performed on video data that is at a final stage of a compression process in accordance with the JPEG2000 Standard. Encrypted video data thus results (a second encryption method). The second encryption method achieves an efficient encryption, requiring a short process time for the encryption process when the already compressed data is subjected to the encryption process. The second encryption method has an advantage that the compressed data remains unchanged in the amount of data after the encryption process.

It is also contemplated that video data is encrypted in a different encoding (compression) domain.

Data can be encrypted in a variety of encoding domains. The encrypted data can then be decrypted. However, when the data is decrypted, it becomes difficult to identify the domain from which the data was encrypted which makes the decryption of the data difficult.

In the above-mentioned encryption techniques, video data is encrypted in a predetermined compression domain. However, it is difficult to set a plurality of compression domains, and to encrypt video data in one compression domain selected from the plurality of compression domains. It is also difficult to simultaneously use the first and second encryption methods.

SUMMARY OF THE INVENTION

The present invention provides an encryption and decryption technique that is applied to data that is encrypted in a predetermined domain of compressed data, for example, JPEG2000 compressed data that is compressed using a wavelet conversion.

According to an aspect of the present invention, a video encrypting method is provided. The video encrypting method includes the steps of inputting compressed video data, generating decompressed video data by decompressing the compressed video data to a predetermined compression domain of a compression process, generating encrypted video data by encrypting the decompressed video data, generating compressed encrypted video data by compressing the encrypted video data in accordance with the predetermined compression domain, and storing information, representing the compression domain, in a predetermined area of the compressed encrypted video data.

Other features and advantages of the invention will become apparent from the following detailed description taken in conjunction with the accompanying drawings.

DESCRIPTION OF THE PREFERRED EMBODIMENTS

Exemplary embodiments of the present invention are described below with reference to the drawings.

Figure 25:
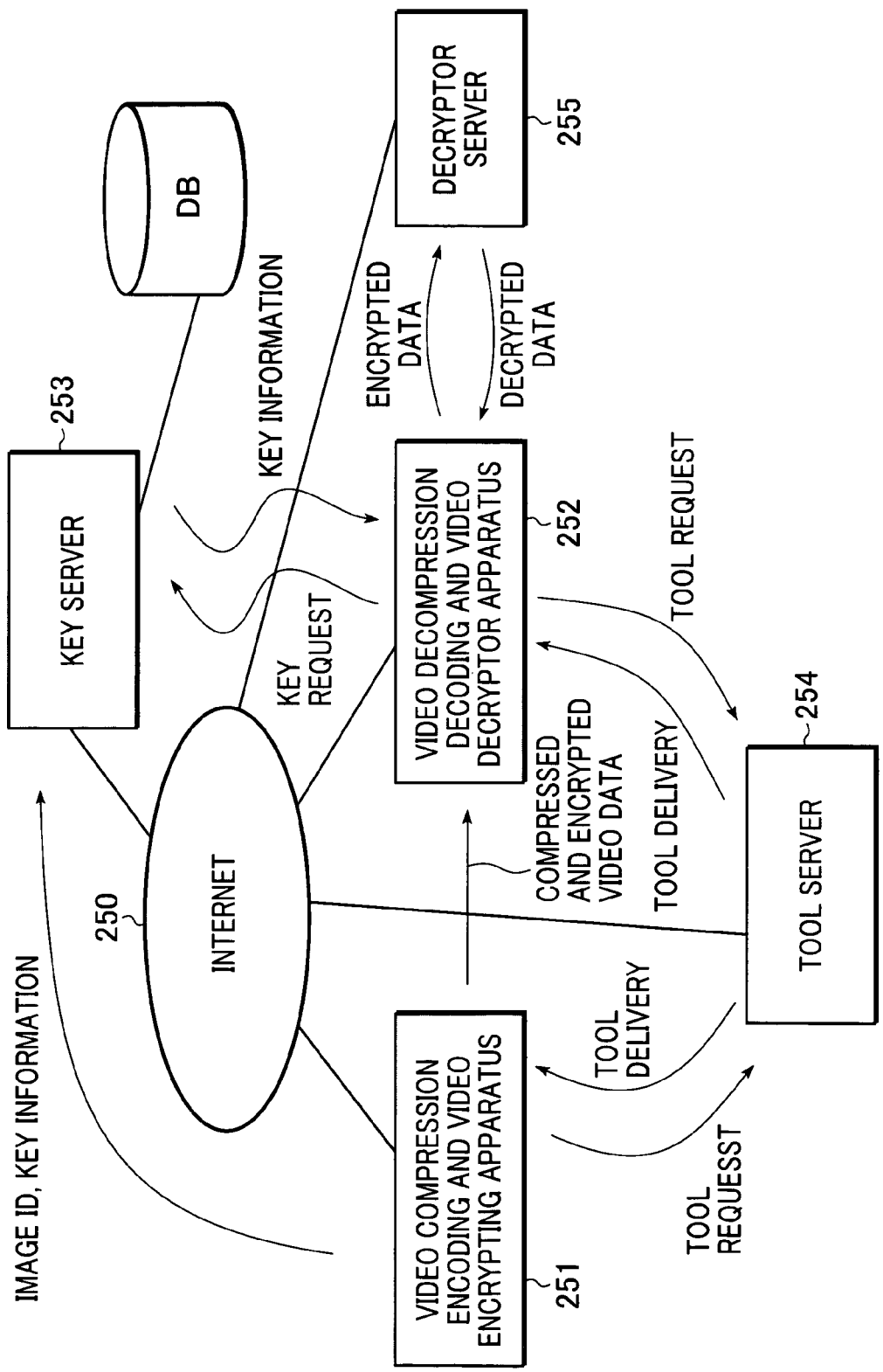
FIG. 25 illustrates the structure of an entire system of the exemplary embodiment of the present invention.

FIG. 25 illustrates the entire system of an exemplary embodiment of the present invention. As shown, a video compression encoding and video encrypting apparatus 251 is connected to the Internet 250. The video compression encoding and video encrypting apparatus 251 encrypts video data that is picked up by a digital camera, an image scanner, or a film scanner. A decompressor and decryptor 252 receives video data via the Internet 250, and decompresses and decrypts the video data. A key server 253 stores decryption key information that the decompressor and decryptor 252 requires to decompress and decrypt the video data. Each of the apparatuses 251-253 may be a general-purpose personal computer.

The video compression encoding and video encrypting apparatus 251 performs a compression process and an encryption process on desired video data, and distributes the resulting data via the Internet 250. The video compression encoding and video encrypting apparatus 251 may directly distribute the video data (for example, using electronic mail), or may distribute the video data through an appropriate server. The database (DB) of the key server 253 stores key information, required to decrypt the video data, together with information (such as an identification) identifying the video data because the video data is encrypted. Upon receiving desired video data, the decompressor and decryptor 252 decompresses and decrypts the video data. To present the video data, the decompressor and decryptor 252 notifies the key server 253 of the information identifying the video, thereby requesting the key information. Using the key information received from the key server 253, the decompressor and decryptor 252 decrypts and decompresses the video data. The decompressor and decryptor 252 requests a tool (program) that is lacking in an encryption process or a decryption process, from a tool server 254. After the tool is delivered to the video compression encoding and video encrypting apparatus 251 and the decompressor and decryptor 252, the encryption process and the decryption process can be performed. If the decompressor and decryptor 252 is unable to decrypt the video data due to lack of a tool, the decompressor and decryptor 252 sends the encrypted data to a decryptor server 255 for decryption. The decryptor server 255 decrypts the video data, and sends the decrypted data to the decompressor and decryptor 252.

For simplicity of explanation herein, an image (file) to be encrypted is data that is encoded using an encoding (compression) method called JPEG2000, standardized by ISO/IEC JTC1/SC29/WG 1 15444-1. The present invention is not limited to JPEG2000. The present invention is applicable to any of a variety of other encoding methods including JPEG.

An operation window 260 of an application performing an encryption process is described next with reference to FIG. 26. The compression process and the encryption process of the video compression encoding and video encrypting apparatus 251 are described later.

Figure 26:
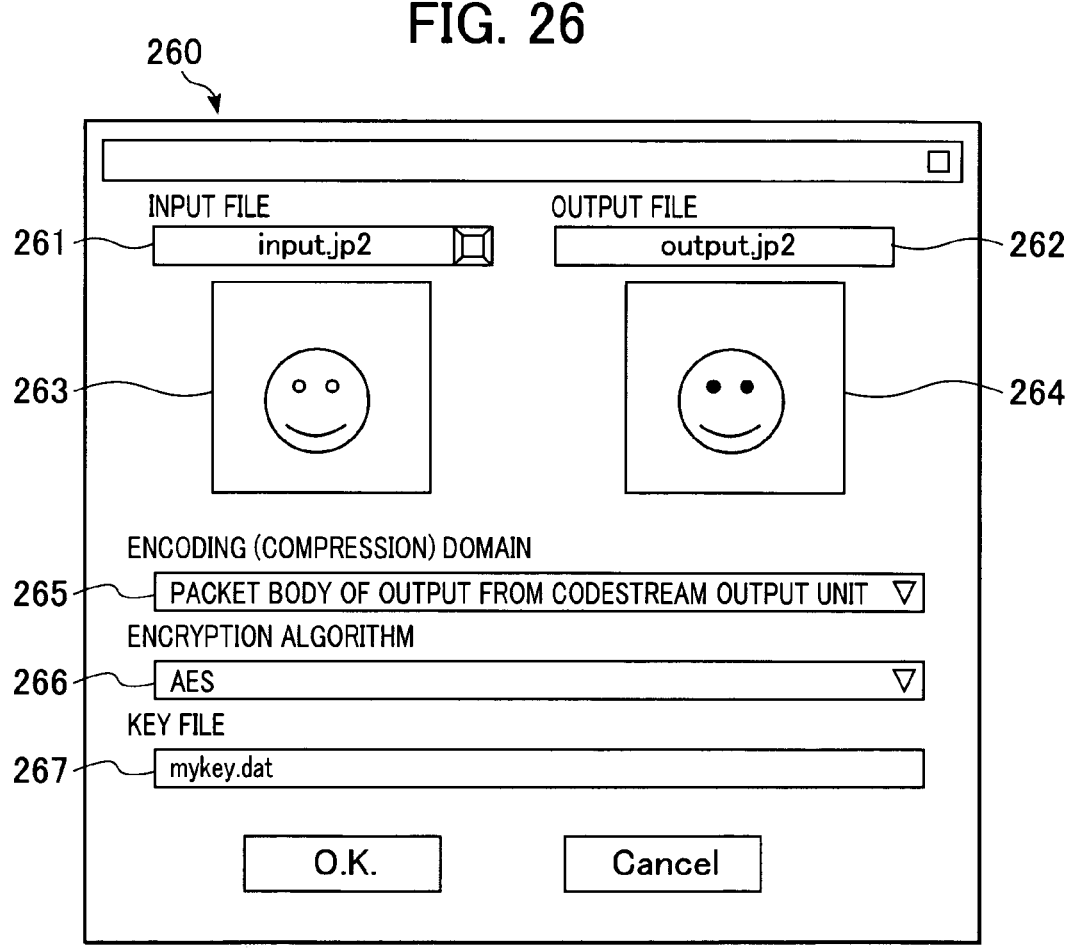
FIG. 26 illustrates a graphical user interface (GUI) for performing the encryption process in accordance with the exemplary embodiment of the present invention.

FIG. 26 illustrates the operation window 260. The operation window 260 includes an input file box 261 for designating a file to be encrypted. A user can designate a file name by entering the file name using a keyboard 3212, or the user can select a file name on a file browser by clicking a button disposed on the right end of the input file box 261 using a mouse 3211. A window 263 displays an image of the selected file. If the file designated in the input file box 261 is compressed (encoded), the file is decompressed (decoded) and then displayed.

The operation window 260 also includes an output file box 262 designating a file name for an encrypted output file, and an image window 264 for displaying an encrypted image.

The operation window 260 also includes an encoding domain box 265 for designating a compression domain, an encryption algorithm box 266 for designating an encryption algorithm, and a key file box 267 for designating a key file. In the exemplary operation window 260 shown in FIG. 26, the encoding domain box 265 and the encryption algorithm box 266 are in the form of comboboxes that allow a user to enter data or to select from among a list of items. The combobox is a control in which the clicking of a right end portion thereof causes a pulldown menu having a list of items to appear for selection. When the OK button is pressed after the selection, the encryption process is performed in accordance with the set key file. As shown in FIG. 25, the key file is uploaded to the key server 253 together with information (the ID and file name) uniquely identifying the encrypted file for registration. Alternatively, the key file registered in the key server 253 can be specified in the key file box 267.

The operation screen 260 of FIG. 26 is shown for exemplary purposes only, and the present invention is not limited to this screen.

Figure 1:
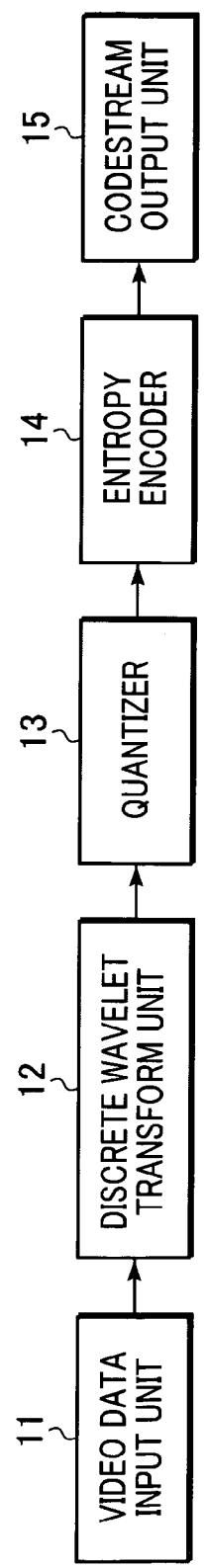
FIG. 1 illustrates the structure of an image compressor of an exemplary embodiment of the present invention.

FIG. 1 illustrates a video compression process in accordance with the present embodiment. The process may be considered as a functional block diagram of the function performed by the video compression encoding and video encrypting apparatus 251 of FIG. 25. For convenience of explanation, the video compression encoding and video encrypting apparatus 251 performs the video compression process. Alternatively, the video compression process may be performed by a computer program.

Referring to FIG. 1, a video data input unit 11 receives video data to be compressed. The video data input unit 11 may be, for example, one of an image scanner 3219, a drive for reading video data from a storage medium 326, and a network interface 3215 to a download video signal through a network.

The video data input unit 11 receives a pixel signal, forming an image to be compressed, in the order of a raster scan. The output of the video data input unit 11 is input to a discrete wavelet transform unit 12. For convenience of explanation, a video signal is a multi-level monochrome signal. If the video signal is used for a color image or an image of a plurality of colors, the video signal can be compressed on a per RGB (red green blue) color component basis, or on a per color component basis for a brilliance component and a color difference component.

Figure 2A:
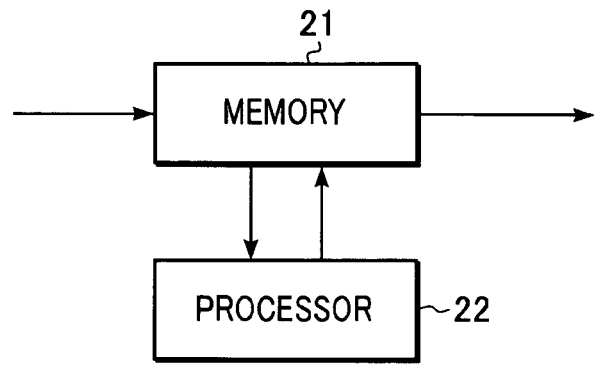
FIG. 2A illustrates the structure of a discrete wavelet transform unit of the exemplary embodiment of the present invention.

The discrete wavelet transform unit 12 performs a two-dimensional discrete wavelet transform process on the input video signal, and calculates and outputs a transform coefficient. FIG. 2A illustrates the basic structure of the discrete wavelet transform unit 12. The discrete wavelet transform unit 12 temporarily stores the input video signal in a memory 21 (for example, RAM 325). The discrete wavelet transform unit 12 successively reads and transforms the video signal using a processor 22 (for example, CPU 323), and writes the transformed video signal into the memory 21. In accordance with the exemplary embodiment, the processor 22 has a structure shown in FIG. 2B.

Figure 2B:
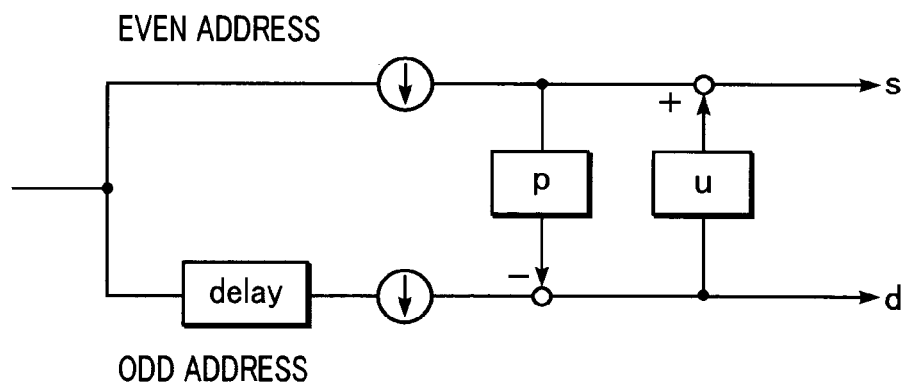
FIG. 2B illustrates the operation of the discrete wavelet transform unit shown in FIG. 2A.

The processor 22, shown in FIG. 2B, separates the input video signal into a signal of an even address and a signal of an odd address (the video data of an even number and an odd number), using a combination of a delay element and a down-sampler. The signals are then filtered through two filters p and u. Referring to FIG. 2B, "s" and "d" respectively represent a low-pass coefficient and a high-pass coefficient when a one-dimensional video signal is subjected to one-level separation, and "s" and "d" are calculated using the following equations:

$$d(n)=x(2*n+1)-\text{floor}((x(2*n)+x(2*n+2))/2) \quad (1)$$

$$s(n)=x(2*n)+\text{floor}((d(n-1)+d(n))/4) \quad (2)$$

where x(n) is a video signal to be transformed, and floor(x) is a function that returns a maximum integer not exceeding x.

In the above process, the video signal is discrete one-dimensional wavelet transformed. Two dimensional discrete wavelet transformation is performed by successively performing one-dimensional wavelet transform on an image in a horizontal direction and then in a vertical direction. Such a transform is a known art, and is not discussed herein.

Figure 2C:
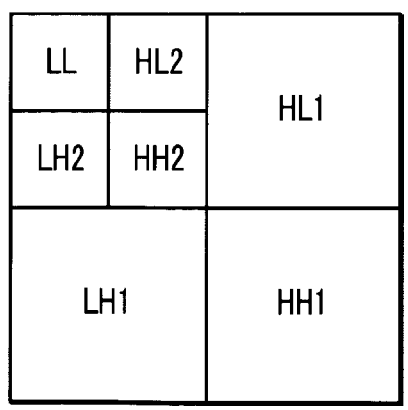
FIG. 2C illustrates the structure of a transform coefficient group having two levels obtained from the two-dimensional discrete wavelet transform unit.

FIG. 2C illustrates the structure of a group of transform coefficients at two levels obtained through the two-dimensional transform process. The video signal is divided into coefficient string HH1, HL1, LH1, . . . LL in different frequency bands. In the discussion that follows, the coefficient string is referred to as subbands. A set of subbands at the same division level is referred to as a resolution level. For example, HH1, HL1, and LH1 belong to the same resolution level. The coefficient of each subband is output to a quantizer 13.

The quantizer 13 quantizes the input coefficients according a predetermined quantization step (for example, using CPU 323), and outputs an index for the quantized value. The quantization is performed in accordance with the following equations:

$$q=\text{sign}(c)*\text{floor}(abs(c)/\Delta) \quad (3)$$

$$\text{sign}(c)=1; c \geq 0 \quad (4)$$

$$\text{sign}(c)=-1; c<0 \quad (5)$$

where "c" is a coefficient to be quantized.

In this exemplary embodiment, the value of Δ is equal to 1. In this case, however, no quantization is performed. The transform coefficient input to the quantizer 13 is output to an entropy encoder 14 as is.

The entropy encoder 14 partitions the subbands into a plurality of rectangular blocks not overlapping each other, divides quantization indices contained in the rectangular blocks into bit planes, performs binary arithmetic coding on a per bit plane basis (for example, using CPU 323), and outputs a codestream to a codestream output unit 15. The rectangular block serving as a unit of coding in the entropy encoder 14 is referred to as a code block.

Figure 3:
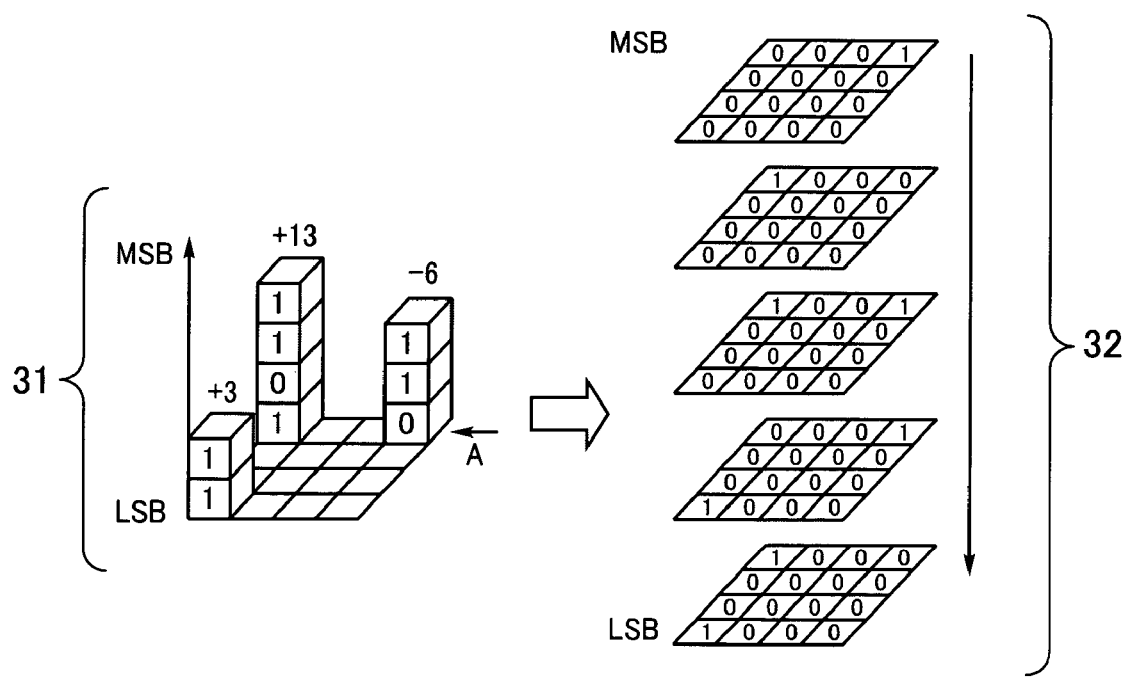
FIG. 3 illustrates an entropy encoding process in accordance with the exemplary embodiment of the present invention.

FIG. 3 illustrates the operation of the entropy encoder 14. In this example, three non-zero indices present in a code block having a size of 4×4, have values of +13, −6, and +3. The entropy encoder 14 determines a maximum value MAX by scanning the code block, and calculates the number S of bits required to express a maximum quantization index using the following equation:

$$S=\text{ceiling}(\log 2(abs(\text{MAX}))) \quad (6)$$

where ceiling(x) is a function representing a smallest integer from among integers not less than x.

In the example shown in FIG. 3, S is 4 because the maximum value shown in chart 31 is "+13". As shown in chart 32 of FIG. 3, the 16 quantization indices in sequence are processed as four bit planes. Since it is necessary to generate positive and negative sign bit planes, coding is performed using a total of five bit planes (S+1) as a unit.

The entropy encoder 14 encodes each bit (in binary arithmetic coding in this exemplary embodiment) at the most significant bit (MSB) plane (positive/negative bit plane representing the most significant bit in the chart 31), and outputs the encoded bit as a bit stream. With the bit level lowered by one level, the entropy encoder 14 encodes each bit within that bit plane and outputs the resulting bit stream to the codestream output unit 15. The entropy encoder 14 successively perform this step until the bits on the lowest bit plane (represented by the least significant bit (LSB)) have been encoded.

The codestream output unit 15 may be a drive for writing a codestream to a storage medium (such as RAM325, HD326, CD328 or FD329), or a network interface (3215) for communicating the codestream via a network.

The resulting entropy code collected in a predetermined amount, as a unit of processing, is referred to as a layer. By forming a plurality of layers, an image is reproduced in response to a variety of code amounts during the decoding process.

The method of decompressing the codestream compressed in the compression process is described next. The decompression process is considered as a function of part of the decompressor and decryptor 252 of FIG. 25.

Figure 4:
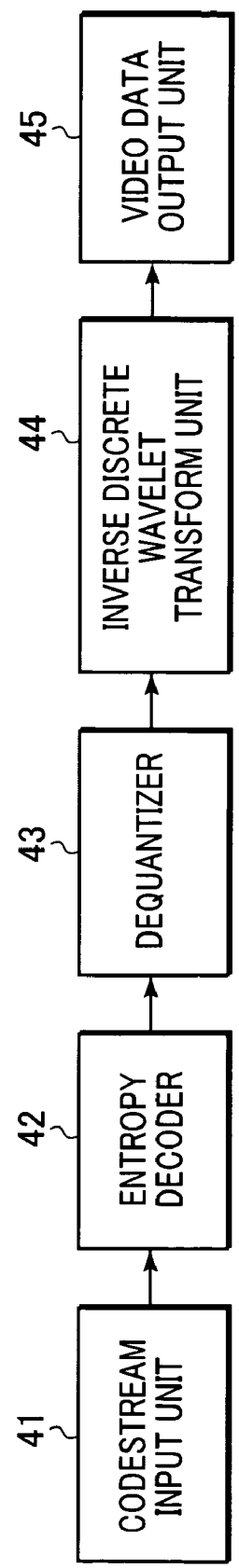
FIG. 4 illustrates a video compression process in accordance with the exemplary embodiment of the present invention.

FIG. 4 is a block diagram of the decompressor of the exemplary embodiment. The decompressor includes a codestream input unit 41, an entropy decoder 42, a dequantizer 43, an inverse discrete wavelet transform unit 44, and a video data output unit 45. In exemplary embodiments, the decompression process is performed by the apparatus. Alternatively, the decompression process can be performed by a computer program.

The codestream input unit 41 receives a codestream, examines a header contained in the codestream to extract a parameter required to perform a subsequent process, controls the flow of process, if required, and sends the parameter to a subsequent unit. The codestream input unit 41 may be a drive for reading the codestream from a storage medium (such as RAM325, HD326, or FD329), or a network interface (3215) for downloading a codestream via a network. The bit stream contained in the codestream is output to the entropy decoder 42.

Figure 5:
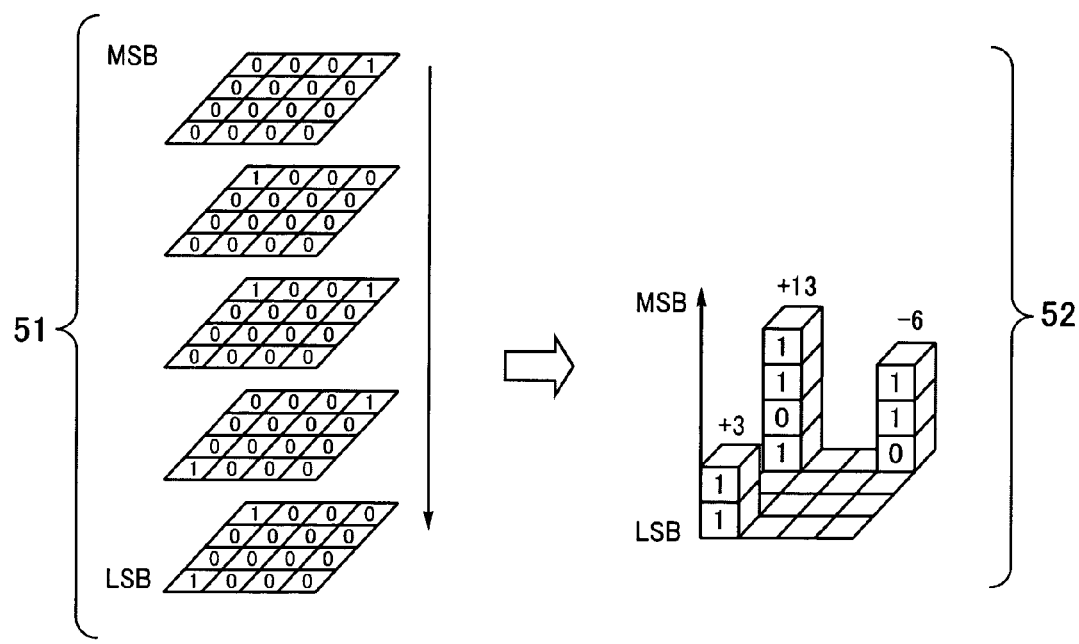
FIG. 5 illustrates an entropy decoding process in accordance with the exemplary embodiment of the present invention.

The entropy decoder 42 divides the bit stream into code blocks, decodes the data in the code blocks on a per bit plane basis (for example, using CPU 323), and outputs the decoded data. The decoding procedure is shown in FIG. 5. As shown by a chart 51 of FIG. 5, the entropy decoder 42 successively decodes the code blocks on a per bit plane basis in the order represented by the arrow of the chart 51, thereby outputting the quantization indices. The restored quantization indices are output by the entropy decoder 42 to the dequantizer 43.

The dequantizer 43 reconstructs the discrete wavelet transform coefficient from the quantization indices (for example, using CPU 323) in accordance with the following equations:

$$c' = \Delta * q;\ q \neq 0 \quad (7)$$

$$c' = 0;\ q = 0 \quad (8)$$

where "q" represents a quantization index, and $\Delta$ is a quantization step. The quantization step $\Delta$ is identical to the one used in the compression process. Here, "c'" is a reconstructed transform coefficient, namely, a coefficient reconstructed from the coefficients "s" and "d". The transform coefficient "c'" is output to the inverse discrete wavelet transform unit 44.

Figure 6A:
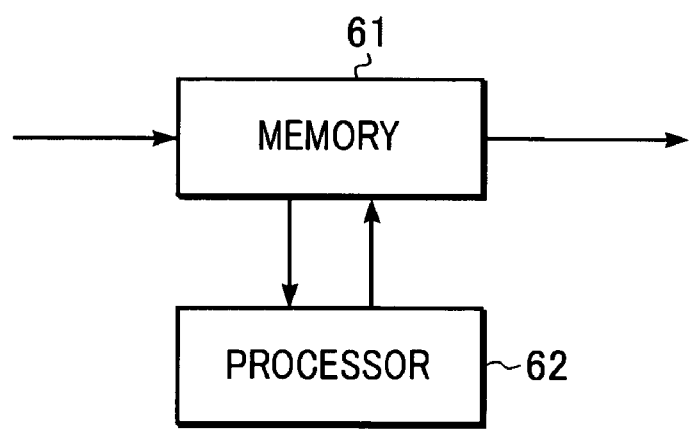
FIG. 6A illustrates the structure of an inverse discrete wavelet transform unit in accordance with the exemplary embodiment of the present invention.
Figure 6B:
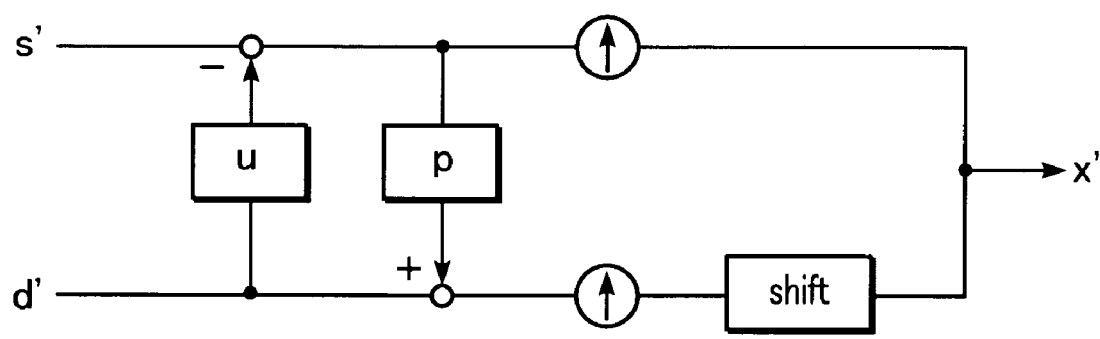
FIG. 6B illustrates the operation of an inverse discrete wavelet transform unit in accordance with the exemplary embodiment of the present invention.

FIG. 6A illustrates the structure of the inverse discrete wavelet transform unit 44, and FIG. 6B is a block diagram of the process of the inverse discrete wavelet transform unit 44. As shown in FIG. 6A, the input transform coefficient is temporarily stored in a memory 61 (for example, RAM 325). A processor 62 (for example, CPU 323) successively performs one-dimensional inverse discrete wavelet transform on the transform coefficients read from the memory 61, thereby performing two-dimensional inverse discrete wavelet transform. The two-dimensional inverse discrete wavelet transform is performed in a procedure that is the inverse of the procedure for the discrete wavelet transform described above with reference to FIGS. 1-3. A detailed discussion thereof is omitted here because the two-dimensional inverse discrete wavelet transform is a known art. Referring to FIG. 6B, the processor 62 performs two filter processes of u and p on the input transform coefficient. The transforms are then upsampled, and then superimposed. A resulting video signal x' is thus output. This process is performed in accordance with the following equations:

$$x'(2*n) = s'(n) - \text{floor}((d'(n-11) + d'(n))/4) \quad (9)$$

$$x'(2*n+1) = d'(n) + \text{floor}((x'(2*n) + x'(2*n+2))/2) \quad (10)$$

Equations (1) and (2) and equations (9) and (10) respectively represent forward and inverse discrete wavelet transforms. To fully satisfy perfect reconstruction condition, namely, to set the quantization step $\Delta$ to be equal to 1, a video signal x' that is obtained by inverse wavelet transforming all decompressed bit planes becomes identical to the signal x of the original image.

The reconstructed image is then output to the video data output unit 45. The video data output unit 45 may be an image display device such as a monitor (3222), a storage device such as a magnetic disk (for example, RAM325, HD326, CD328, FD329, 3210), or a network interface (3215) for communicating a reconstructed image via a network.

The encryption process implemented in the exemplary embodiment of the present invention is described next.

Figure 7:
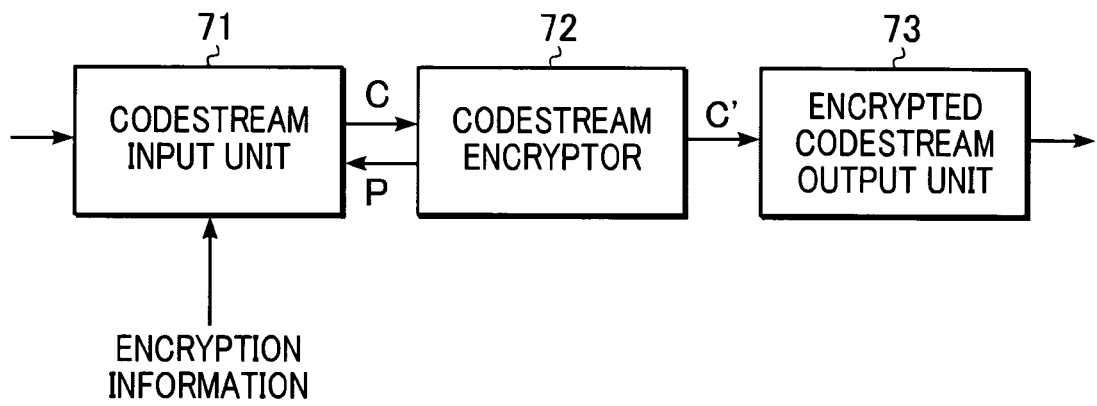
FIG. 7 illustrates the structure of an encryptor in accordance with the exemplary embodiment of the present invention.

FIG. 7 is a block diagram illustrating the process of the encryptor of the exemplary embodiment. The encryptor includes a codestream input unit 71, a codestream encryptor 72, and an encrypted codestream output unit 73.

The codestream input unit 71 receives a codestream (from ROM324, RAM325, HD326, CD328, FD329, DVD3210, or NIC3215), examines a header contained in the codestream to extract a parameter required to perform a subsequent process, controls the flow of process if required, and sends the parameter to a subsequent process unit. The codestream input unit 71 is thus considered as receiving the output from the codestream output unit 15 of FIG. 1. The codestream from the codestream input unit 71 is output to the codestream encryptor 72.

The codestream encryptor 72 can accept a variety of add-on encrypting functions. The add-on encrypting functions handle different data to be encrypted, namely, different compression domains. The exemplary embodiment switchably registers at least one of the following output data: output data from a codestream output unit, output data from an entropy encoder, output from a quantizer, output from a discrete wavelet transform unit, and output from a video data generator. Furthermore, a portion of the output data, rather than the entire output data, from each unit can be registered. For example, a packet body of the output of the codestream encryptor, or a sign bit plane of the output of the quantizer can be registered. The packet body is described later.

The codestream input unit 71 receives information of the encryption domain (the domain designated in the encoding (compression) domain box 265 of FIG. 26), and encryption information including an encryption algorithm, and encryption key information. The codestream input unit 71 issues, to the codestream encryptor 72, a signal C as a performance enquiry (a command format distinguished from the codestream) to determine the encryption algorithm and the compression domain that the codestream encryptor 72 used to encrypt the codestream. The reply to the signal C is returned as a signal P to the codestream input unit 71 as shown in FIG. 7. The codestream encryptor 72 notifies the codestream input unit 71 of the signal P that indicates whether the codestream encryptor 72 has an encryption process function compatible with the compression domain and the encryption algorithm designated by a user.

Referring to FIG. 26, the user designates the compression domain in encoding (compression) domain box 265. However, it is inconvenient to designate the compression domain each time. The information relating to the set compression domain, encryption algorithm, and key information may be stored in a hard disk, etc., and the encryption process may be performed under the same setting as long as the setting requires no updating.

The codestream encryptor 72 performs the encryption process and the compression process in accordance with the compression domain and the encryption algorithm designated by the codestream input unit 71. The encrypted codestream C' is then output to the encrypted codestream output unit 73. For example, the encrypted codestream output unit 73 outputs, to a destination, the codestream as a file name designated in output box 262 as shown in FIG. 26. The codestream output unit 73 may be a drive for writing the codestream to a storage medium (such as RAM325, HD326, CD328, or FD329), or a network interface (3215) for communicating the codestream via a network.

The functions registered in the codestream encryptor 72 include a function for encrypting data in a domain that is in the middle of the compression process. The codestream encryptor 72 thus has a function of decompressing the data to that domain.

Two examples of the codestream encryption process of the codestream encryptor 72 are described next. In a first encryption process, a sign bit plane of the output from the quantizer is set as the compression domain. In a second encryption method, a packet body of the output of the codestream output unit is set as the compression domain. The present invention is not limited these methods, and is applicable to a variety of compression domains.

Figure 9:
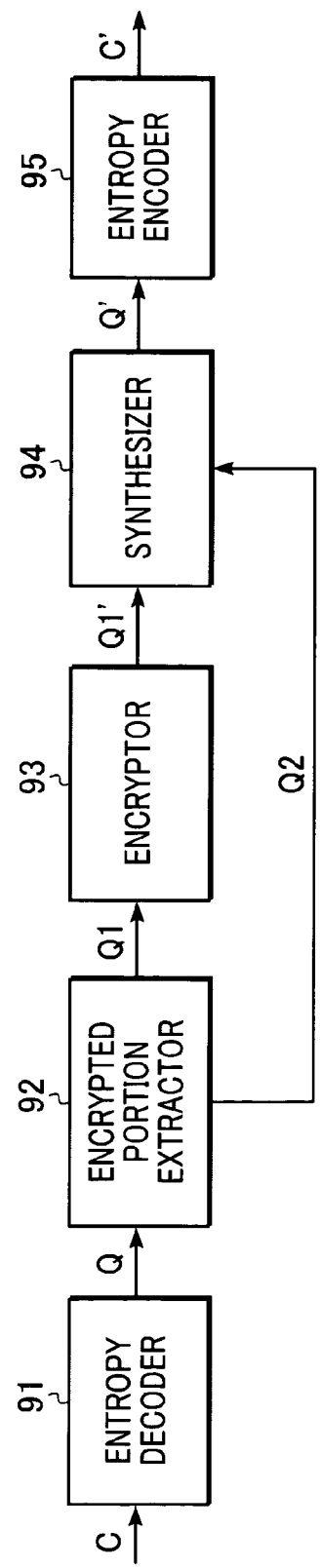
FIG. 9 illustrates an arrangement for performing a first codestream encryption of the exemplary embodiment of the present invention.

FIG. 9 illustrates the first encryption method. The first encryption method is implemented using an entropy decoder 91, an encrypted portion extractor 92, an encryptor 93, a synthesizer 94, and an entropy encoder 95.

The entropy decoder 91 is identical in operation to the entropy decoder 42 of FIG. 4, and the entropy encoder 95 is identical in operation to the entropy encoder 14 of FIG. 1. Therefore, the discussion of the operation of these elements is omitted here.

The encrypted portion extractor 92 receives a quantization index Q from the entropy decoder 91, extracts a sign bit plane Q1 from the input quantization indices, and outputs the extracted sign bit plane Q1 to the encryptor 93. The remaining bit planes Q2 are output to the synthesizer 94.

Upon receiving the sign bit plane Q1 from the encrypted portion extractor 92, the encryptor 93 performs the encryption process on the input sign bit plane Q1, and outputs the encrypted sign bit plane Q1'.

The present invention is not limited to any particular encryption algorithm. For example, any of a variety of encryption algorithms such as secret key cryptosystems including data encryption standard (DES) and advanced encryption standard (AES) or a public key cryptosystem such as RSA may be used.

Figure 13:
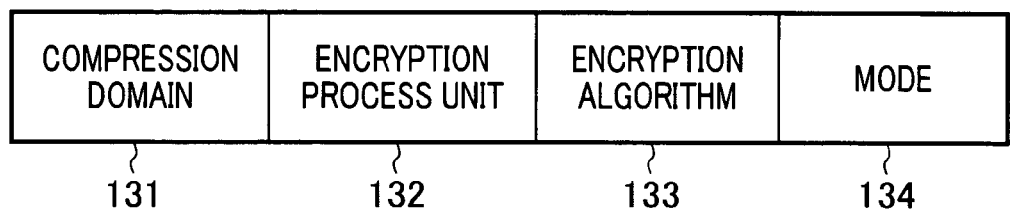
FIG. 13 illustrates information attached to the codestream of the exemplary embodiment of the present invention.

The information relating to encryption attached to the codestream is described next with reference to FIG. 13. Compression domain information 131 relating to the compression domain during encryption, encryption unit process information 132, encryption algorithm information 133 relating to the encryption algorithm used in the encryption, and mode information 134 relating to an encryption mode are shown in FIG. 13. These pieces of information are recorded in the codestream (in a main header, for example) to be transferred to a decryption process unit.

In exemplary embodiments any of a plurality of compression domains is selected, and the data in the selected domain is encrypted. As the compression information 131 representing the selected compression domain is recorded in the codestream, the compression domain data used for encryption is known in the decryption process. The decryption process is thus correctly performed.

The selected compression domain to be attached to the codestream is only one example. The present invention is not limited to this example.

The synthesizer 94 receives the encrypted sign bit plane Q1' and the bit plane(s) Q2 not extracted by the encrypted portion extractor 92. The encrypted bit plane Q1' is synthesized with the bit plane(s) Q2 at the position of the sign bit plane, and is then output as a synthesized quantization index Q'.

The process of the encrypted portion extractor 92, the encryptor 93, and the synthesizer 94 are described next with reference to FIG. 10.

Figure 10:
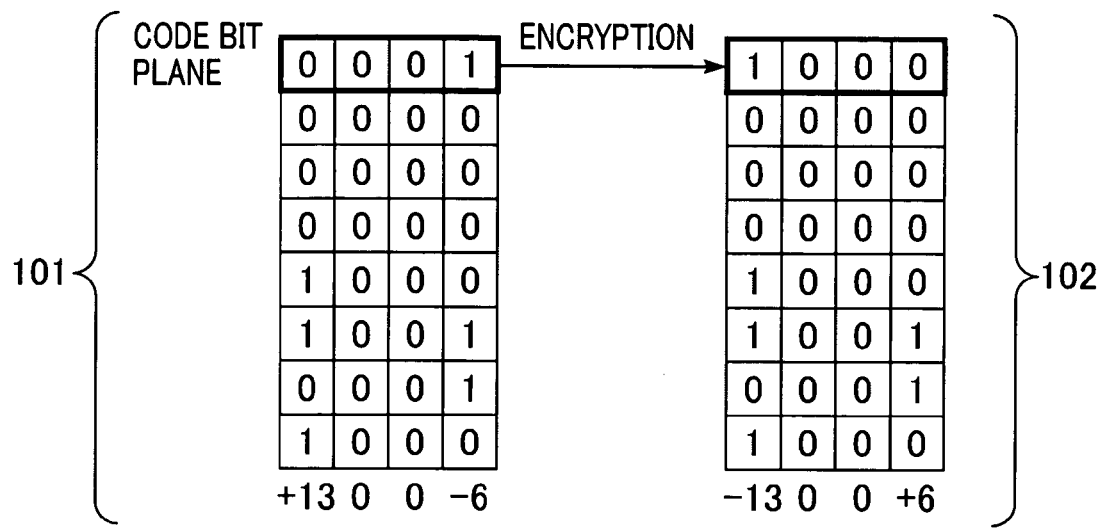
FIG. 10 illustrates the content of a first encryption process of the exemplary embodiment of the present invention.

As shown in FIG. 10, a chart 101 illustrates an example of a portion of the code block of FIG. 3 (one row indicated by an arrow A in the chart 31 of FIG. 3). As shown in the chart 101, the sign bits of the quantization indices $\{+13, 0, 0, -6\}$ of FIG. 10 are respectively $\{0, 0, 0, 1\}$ if a positive sign is 0, and a negative sign is 1 (zero is 0). The sign bit plane Q1 is thus extracted by the encrypted portion extractor 92. As previously discussed, the entropy encoding process in the exemplary embodiment takes advantage of redundancy of each bit plane, and is performed for each bit plane. By encrypting all of the sign bit planes forming the quantization indices, redundancy is reduced, and the effect of the compression in the subsequent entropy encoding process becomes small. For this reason, only the sign bit plane of the quantization indices is extracted by the encrypted portion extractor 92 for encryption.

The extracted bit plane Q1$\{0,0,0,1\}$ is encrypted by the encryptor 93 (for example, using CPU323), thereby becoming the encrypted sign bit plane Q1' $\{1,0,0,0\}$. As shown, the signs of values other than zero happen to be reversed. However, the signs are practically randomized because they are determined depending on the encryption algorithm, the key information, and the logical operation of the data to be encrypted. Without the decryption key information corresponding to the encryption key information, the correct sign bit plane cannot be decrypted.

The bit plane Q1' thus encrypted is synthesized with the remaining bit planes Q2 by the synthesizer 94 as shown in a chart 102 of FIG. 10. The resulting encrypted quantization indices Q' $\{-13, 0, 0, +6\}$ are thus output.

The first encryption method for treating the sign bit plane out of the output from the quantizer as the compression domain has been described.

The second encryption method for treating the packet body of the output from the codestream output unit as the compression domain is described next.

Figure 11:
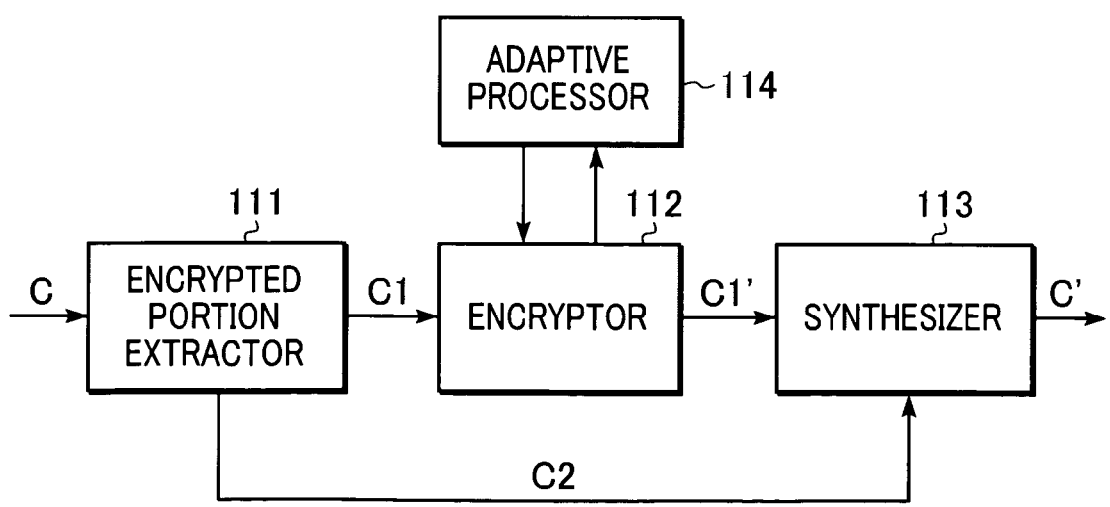
FIG. 11 illustrates an arrangement for performing a second codestream encryption of the exemplary embodiment of the present invention.

FIG. 11 illustrates the second encryption method. As shown, the arrangement for the second encryption method includes an encrypted portion extractor 111, an encryptor 112, a synthesizer 113, and an adaptive processor 114.

The encrypted portion extractor 111 receives the codestream C, extracts only a packet body C1 out of the codestream, and outputs the extracted packet body C1 to the encryptor 112. The component C2 other than the packet body C1 is output to the synthesizer 113.

Figures 12A, 12B:
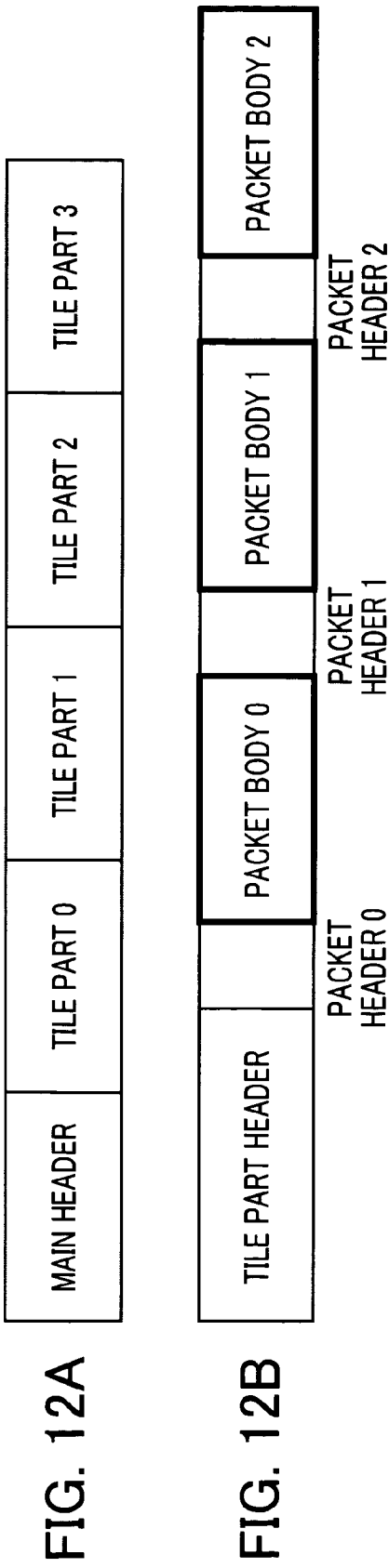
FIG. 12A illustrates the data structure of an encoded codestream.
FIG. 12B illustrates the data structure of a tile part.

The packet body C1 is described next with reference to FIGS. 12A and 12B. FIG. 12A illustrates the entire structure of the codestream C (a stream subsequent to the compression process in accordance with JPEG2000 of FIG. 1). As shown, the codestream C includes a main header and a plurality of tile parts. As shown in FIG. 12B, each tile part includes a tile-part header and a plurality of packets. Each packet includes a packet header and a packet body.

In accordance with the exemplary embodiment, only the packet body C1 is extracted out of the codestream C having the structure of FIG. 12A, and is subjected to the encryption process. In this way, the encrypted codestream C' has a structure complying with the same standard as the input codestream C (JPEG2000, for example).

The encryptor 112 receives the packet body C1 from the encrypted portion extractor 111, encrypts the input packet body C1 (for example, using CPU323), and outputs the encrypted packet body C1'.

The present invention is not limited to any particular encryption algorithm. For example, any of a variety of encryption algorithms such as secret key cryptosystems including data encryption standard (DES) and advanced encryption standard (AES) or a public key cryptosystem such as RSA may be used. As shown in FIG. 13, the applied compression domain and encryption algorithm may be recorded in the main header of the codestream C to be transferred to the decryptor as will be discussed later. Furthermore, information relating to the encryption processing unit 132 and encryption mode 134 may also be transferred. The information relating to the encrypted compression domain 131, the information relating to the encryption processing unit 132, the information relating to the used encryption algorithm 133 and mode 134 are recorded in the main header. This is also performed in the process discussed with reference to FIGS. 9 and 10.

The encryptor 112 can perform the encryption process using the adaptive processor 114. The adaptive processor 114 adapts the encrypted packet body C1' to the JPEG2000 Standard. The synthesizer 113 receives the encrypted packet body C1' and the component C2 of the codestream C determined as being a non-encrypted portion by the encrypted portion extractor 111. The synthesizer 113 synthesizes the encrypted packet body C1' at the original position thereof, thereby outputting the synthesized codestream C'.

The second encryption method for treating the packet body of the output from the codestream output unit as the compression domain has been described.

The encrypted codestream is then output from the encrypted codestream output unit 73. The flow of the above-described encryption process is described next with reference to FIG. 8. In step S81, a compression domain to be encrypted is designated (see FIG. 26). In step S82, the codestream input unit 71 determines whether the codestream encryptor 72 can encrypt the designated compression domain. The codestream encryptor 72 records processing capability information P beforehand. The codestream input unit 71 performs this determination by receiving the processing capability information P relating to the encryption process from the codestream encryptor 72. In exemplary embodiments, the codestream encryptor 72 sends the following processing capability information P relating to encrypting the following output data from the output units in the compressor of FIG. 1: capability of processing the output from the codestream output unit 15; capability of processing the output from the entropy encoder 14; capability of processing the output from the discrete wavelet transform unit 12; and capability of processing the output from the video data generator.

Furthermore, processing capability relating to the capability of processing a portion of the output data, rather than the entire output data, from each unit may be sent. For example, processing capability information relating to the capability of processing a packet body of the output of the codestream output unit 15, or a sign bit plane of the output of the quantizer 13 may be sent.

If the codestream input unit 71 determines in step S82 that the codestream encryptor 72 is not able to encrypt the designated compression domain, the encryption process ends. In exemplary embodiments, an error message that the designated compression domain cannot be encrypted may be displayed.

If the codestream input unit 71 determines in step S82 that the data in the designated compression domain can be encrypted, processing proceeds to step S83. The compressed data is decompressed until the compression domain determined in step S81. When the data to be encrypted is generated in this way, the encryption process is performed in accordance with the encryption algorithm designated by the user (step S84). In step S85, the compression process is performed as opposed to the process step in step S83. When the compressed data is finally produced, information relating to what compression domain data is encrypted (in the encryption process shown in FIG. 13) is stored in the main header in step S86. In step S87, the information is output as the codestream.

In accordance with the exemplary embodiment, the information relating to the encryption process of FIG. 13 is stored in the main header subsequent to the completion of the data compression. The present invention is not limited to this method. The information relating to the encryption process may be stored at any appropriate time. For example, the compression domain designated in step S81 may be stored in the main header prior to the compression process.

In the above-described second encryption method, the packet body at a final stage of data encoding is encrypted and steps S83 and S85 are skipped.

The determination process in step S82 is described next. In order for encryption to be possible, the compression domain (determined in step S81) must be compatible with an available capability. For example, if the output from the entropy encoder 14 is designated as the compression domain in step S81, and if an identification of the processing capability of "processing the output of the entropy encoder 14" is received, encryption is determined as being possible to perform and processing proceeds to step S83. On the other hand, if the output from the discrete wavelet transform unit 12 is designated as the compression domain in step S81, and if an identification of the processing capability of "processing the output of the entropy encoder 14" is received, encryption is determined as being difficult to perform and the encryption process ends.

The information identifying the appropriate compression domain from among the plurality of compression domains, and the information identifying the encryption algorithm are recorded in the main header of the codestream. If these pieces of information are examined, the encrypted domain and the used algorithm are detected. The detected results may be used by the decryptor.

In accordance with the exemplary embodiment, the compressed data in a desired domain out of intermediate domains is encrypted.

The decryption process of the exemplary embodiment is describe next.

Figure 14:
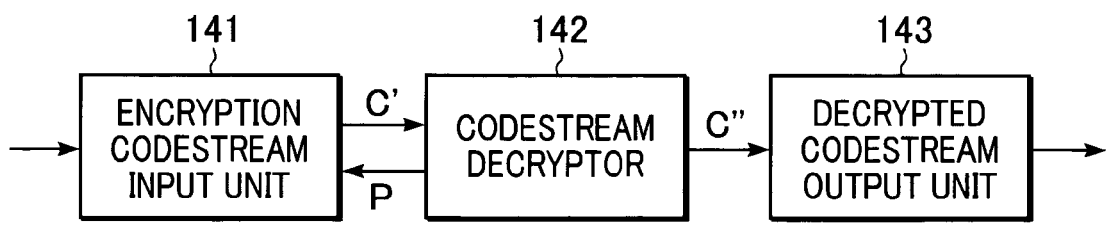
FIG. 14 illustrates the structure of a decryptor of the exemplary embodiment of the present invention.

FIG. 14 is a block diagram of the decryptor in accordance with the exemplary embodiment. The decryptor includes an encryption codestream input unit 141, a codestream decryptor 142, and a decrypted codestream output unit 143.

The encryption codestream input unit 141 receives a codestream (from ROM324, RAM325, HD326, CD328, FD329, DVD3210, or NIC3215), examines a header contained in the codestream to extract a parameter required to perform a subsequent process, controls the flow of process if required, and sends the parameter to the codestream decryptor 142. More specifically, the encryption codestream input unit 141 receives the output from the encrypted codestream output unit 73 of FIG. 7. The input codestream is output to the codestream decryptor 142.

The encryption codestream input unit 141 acquires the compression domain to be decrypted, and an encryption algorithm by examining the data of the input codestream of FIG. 13. The encryption codestream input unit 141 determines whether the codestream decryptor 142 has a decrypting capability required for the decryption. If decryption key information is provided by a user, the encryption codestream input unit 141 supplies the codestream decryptor 142 with the encrypted compression domain, the encryption algorithm, and the encryption key information. The encryption codestream input unit 141 then outputs the encrypted codestream C' to the codestream decryptor 142.

The codestream decryptor 142 receives an encrypted codestream C', decrypts the data in the compression domain set in the encryption codestream input unit 141 with the set decryption key information and decryption algorithm. The codestream decryptor 142 then outputs decrypted codestream C". The codestream C" is then output to the entropy decoder 91 of FIG. 9.

As in the encryption process of the encryptor, there are a first decryption method and a second decryption method which are described next. In the first decryption method, "a sign bit plane out of the output from the quantizer" is set as the compression domain. In the second decryption method, "a packet body of the output from the codestream output unit" is set as the compression domain.

For convenience of explanation herein, it is assumed in the first decryption method that the packet body of the output from the codestream output unit is designated as the compression domain, and it is assumed in the second decryption method that the sign bit plane of the output from the quantizer is designated as the compression domain. As previously discussed, a variety of compression domains may be set.

Figure 16:
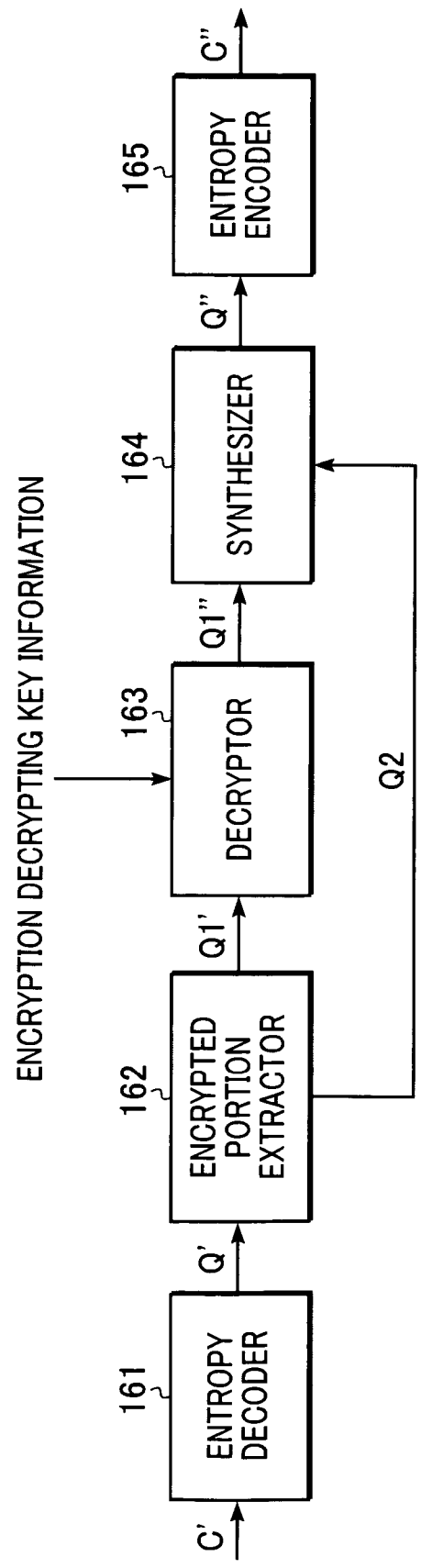
FIG. 16 illustrates the structure of a first decryptor of the exemplary embodiment of the present invention.

The first decryption method is discussed first with reference to FIG. 16. FIG. 16 is a functional block diagram of the first decryption method. The arrangement of FIG. 16 is a portion of the codestream decryptor 142 of FIG. 14. FIG. 16 shows an entropy decoder 161, an encrypted portion extractor 162, a decryptor 163, a synthesizer 164, and an entropy encoder 165.

The entropy decoder 161 operates in the same way as the entropy decoder 42 of FIG. 4, the entropy encoder 165 operates in the same way as the codestream output unit 15 of FIG. 1, and the encrypted portion extractor 162 and the synthesizer 164 operate in the same way as the encrypted portion extractor 92 and the synthesizer 94 of FIG. 9, respectively, and the discussion of those elements are omitted here.

The decryptor 163 receives a positive/negative sign bit plane Q1' from the encrypted portion extractor 162, decrypts the input signal bit plane Q1' in accordance with the set decryption key information (for example, using CPU323), and outputs the resulting decrypted sign bit plane Q1".

The process of the encrypted portion extractor 162, the decryptor 163, and the synthesizer 164 are described next with reference to FIG. 17.

Figure 17:
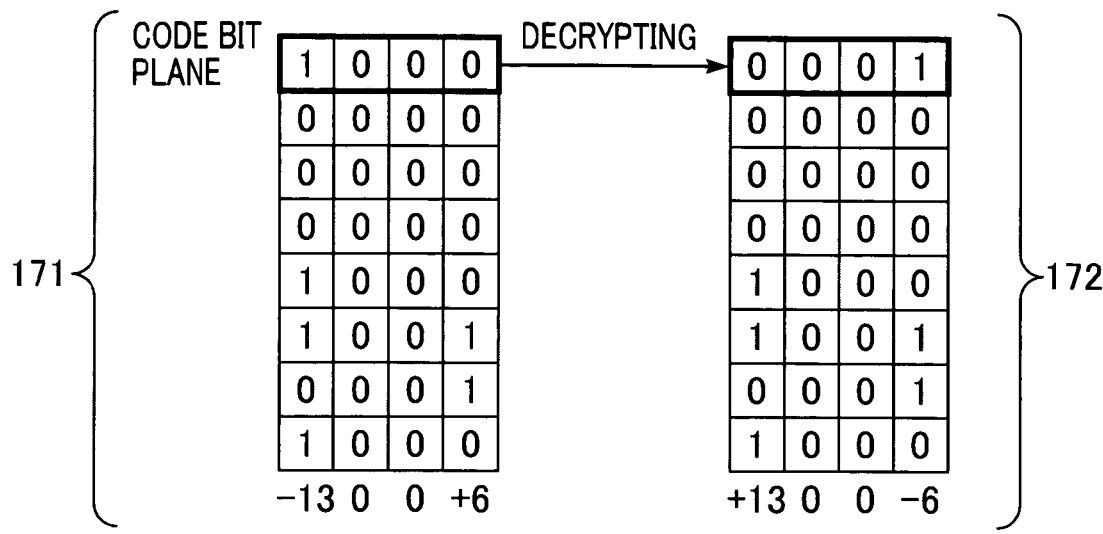
FIG. 17 illustrates the process content of the first decryptor of the exemplary embodiment of the present invention.

As shown in FIG. 17, a chart 171 illustrates an example of one row of code block subsequent to entropy decoding. As shown in the chart 171, the sign bits of the quantization indices $\{+13, 0, 0, -6\}$ are respectively $\{1, 0, 0, 0\}$ if a positive sign is 0, and a negative sign is 1 (zero is 0). The sign bit plane Q1' is thus extracted by the encrypted portion extractor 162.

The decryptor 163 decrypts extracted sign bit plane Q1' $\{1,0,0,0\}$, thereby outputting decrypted bit plane Q1" $\{0,0,0,1\}$.

The synthesizer 164 synthesizes the decrypted bit plane Q1" with the bit plane Q2 shown at a chart 172 of FIG. 17, thereby outputting decrypted quantization indices Q" $\{-13, 0, 0, 6\}$. The entropy encoder 165 of FIG. 16 entropy encodes the decrypted quantization indices Q" again, thereby generating a decrypted codestream. After the process illustrated in FIG. 4, the data is reconstructed as an image.

The first decryption method with the sign bit plane of the output of the quantizer set as the compression domain has been described. The second decryption method is described next.

Figure 18:
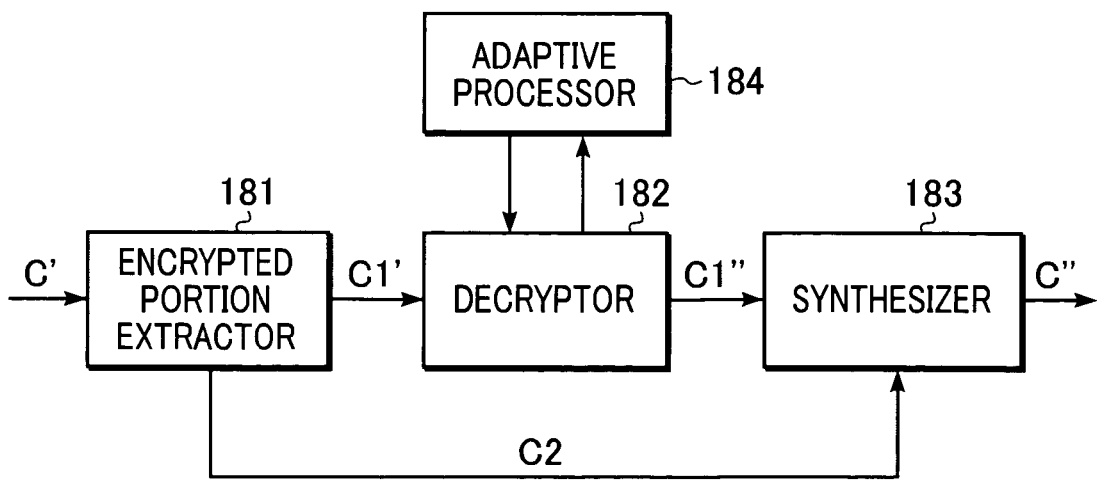
FIG. 18 illustrates the structure of a second decryptor of the exemplary embodiment of the present invention.

FIG. 18 is a functional block diagram of the second decryption method. The arrangement of FIG. 18 is a portion of the codestream decryptor 142 of FIG. 14, and functions by reading information recorded in the codestream of FIG. 13.

FIG. 18 illustrates an encrypted portion extractor 181, a decryptor 182, and a synthesizer 183. Since the encrypted portion extractor 181 and the synthesizer 183 operate in the same way as the encrypted portion extractor 162 and the synthesizer 164 of FIG. 16, respectively, the discussion thereof is omitted here.

Upon receiving a packet body C1' from the encrypted portion extractor 181, the decryptor 182 decrypts the input packet body C1' (for example, using CPU323), and outputs the decrypted packet body C1". The decryptor 182 may decrypt the input packet body C1' using an adaptive processor 184 if the adaptive processor 184 is of the same type as the adaptive processor 114 described above with reference to FIG. 11.

The second decryption method with the packet body of the output of the codestream output unit set as the compression domain has been discussed. The resulting decrypted codestream is output from the decrypted codestream output unit 143. For example, decrypted codestream output unit 143 outputs, to a destination, the codestream as a file name designated in output box 26s as shows in FIG. 26. The codestream output unit 143 may be a drive for writing the codestream to a storage medium (such as RAM325, HD326, CD-328, or FD329), or a network interface (3215) for communicating the codestream via a network.

Figure 15:
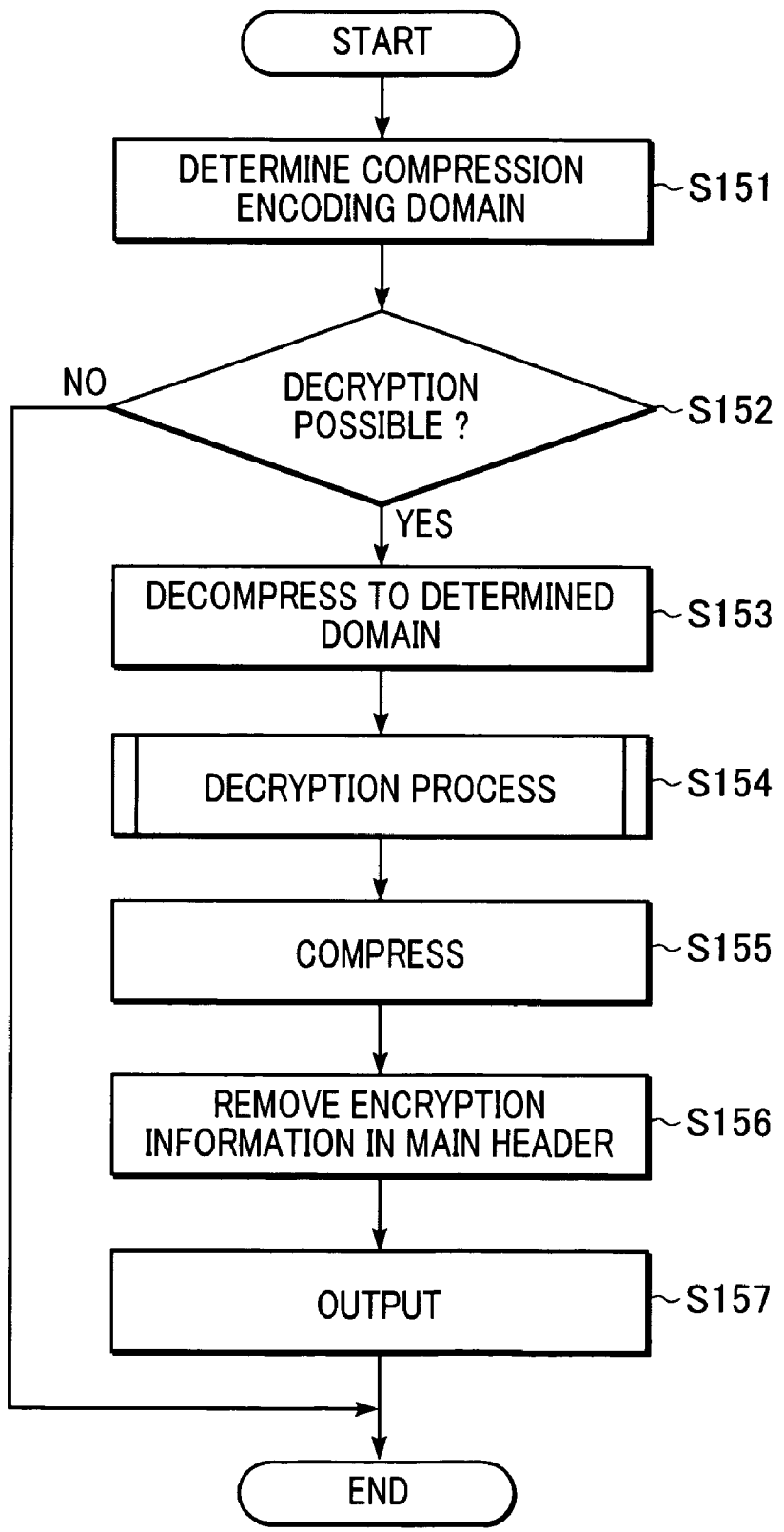
FIG. 15 is a flowchart of a decryption process of the exemplary embodiment of the present invention.

The flow of the above-described decryption process is described next with reference to FIG. 15. FIG. 15 is a flowchart illustrating the decryption process implementing the exemplary embodiment.

In step S151, the encryption codestream input unit 141 reads the encryption information (the compression domain in which the encryption process has been performed, and the encryption algorithm) attached to the codestream, and determines the encrypted compression domain.

In step S152, the encryption codestream input unit 141 determines whether the codestream decryptor 142 can decrypt the data in the read compression domain. The codestream decryptor 142 records processing capability information P relating to the decryption process beforehand, and the codestream input unit 141 performs this determination by receiving the processing capability information P relating to the decryption process from the codestream decryptor 142. The processing capability information P relating to the decryption process is similar to the encryption processing capability information P, and the discussion thereof is omitted here.

If the codestream input unit 141 determines in step S152 that the codestream decryptor 142 is not able to decrypt the designated compression domain, the encryption process ends. In exemplary embodiments, an error message that the designated compression domain cannot be decrypted is displayed.

If the codestream input unit 141 determines in step S152 that the designated compression domain can be decrypted, processing proceeds to step S153 where the compressed data is decompressed until the encrypted compression domain. In step S154, the decryption process is performed. In step S155, a compression process is performed that is the inverse of the decompression process performed in step S153. In step S156, a main header with the encryption information removed in the codestream is generated. In step S157, a decrypted and compressed stream is output.

In accordance with the decryption process of the exemplary embodiment, the information representing the compression domain selected from among the plurality of compression domains used to encrypt the data is sent from the encryptor to the decryptor. In this arrangement, data encrypted in different compression domains is decrypted by a common decryptor.

In the encryption process, one domain is selected from the plurality of compression domains. If the selected compression domain is encryptable, the encryption process is performed. If the selected compression domain is not encryptable, the encryption process is not performed. In the decryption process, it is determined whether the encrypted data in any of the compression domains is decryptable. If it is determined that the encrypted data is decryptable, the decryption process is performed. If it is determined that the encrypted data is not decryptable, the decryption process is not performed.

The present invention is not limited to this method. In the encryption process, one domain to be encrypted is selected from among a plurality of compression domains. If the selected domain is encryptable, the encryption process is performed. If the selected domain is not encryptable, a function enabling encryption is added to execute the encryption process. In the decryption process, it is determined whether the encrypted data in the any of the compression domains is decryptable. If it is determined that the encrypted data is decryptable, the decryption process is performed. If it is determined that the encrypted data is not decryptable, a function enabling decryption is added to decrypt the encrypted data. This modification of the exemplary embodiment is described next with reference to FIGS. 19 and 20. In this modification, the arrangements illustrated in FIGS. 7 and 14 are implemented using computer programs.

Figure 19:
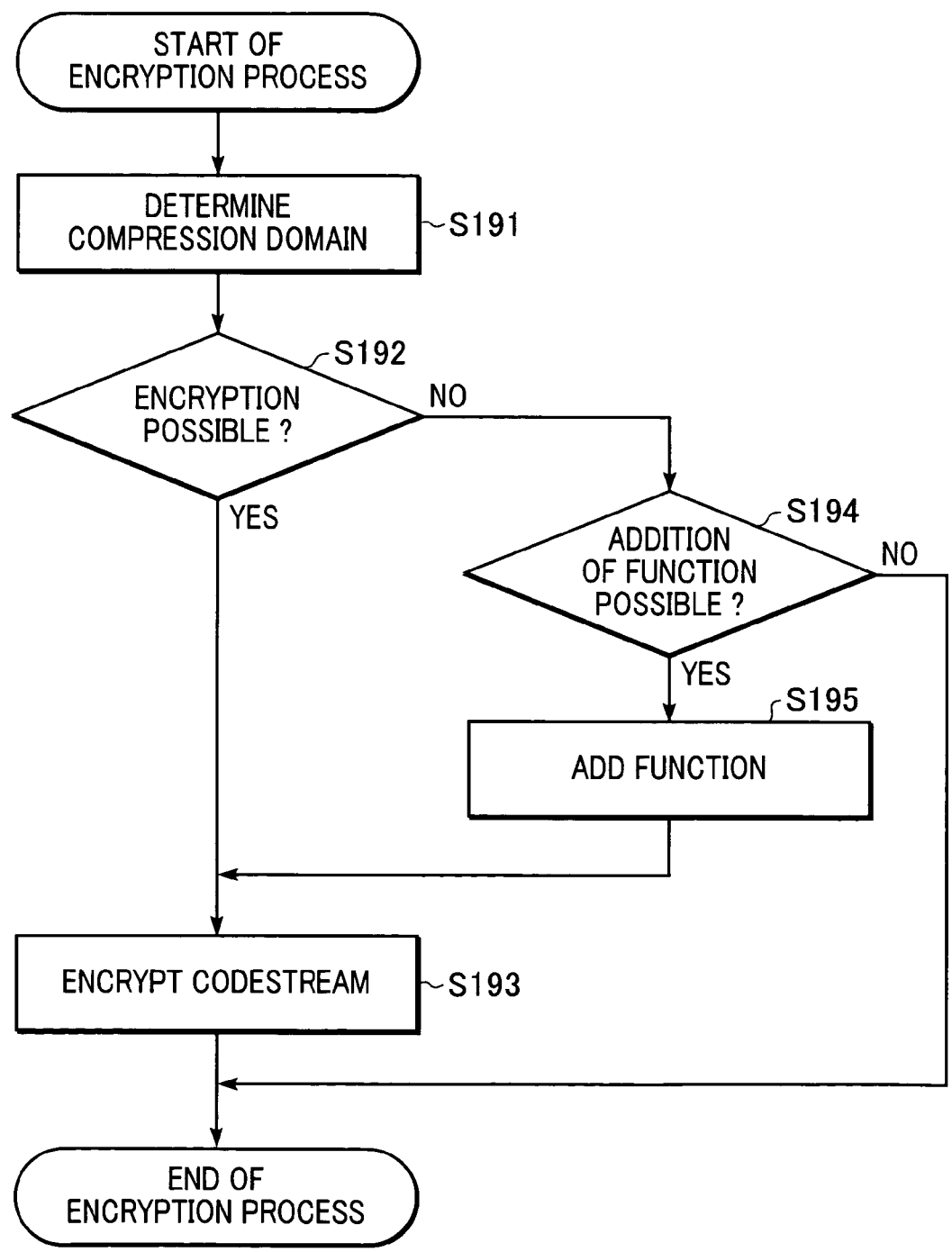
FIG. 19 is a flowchart of a modification of the encryption process in accordance with the exemplary embodiment of the present invention.

FIG. 19 is a flowchart of the modification of the encryption process performed by the codestream input unit 71 of FIG. 7.

In step S191, the codestream input unit 71 acquires the user designated compression domain to be encrypted. In step S192, the codestream input unit 71 determines whether the codestream encryptor 72 can perform the encryption process in the compression domain designated by the user. In other words, the codestream input unit 71 determines whether the codestream encryptor 72 has an encryption function in the designated compression domain. To this end, the codestream encryptor 72 records beforehand the processing capability information P relating to the encryption process. The codestream input unit 71 thus performs the determination process by receiving the information P relating to the encryption process from the codestream encryptor 72.

If the codestream input unit 71 determines that the codestream encryptor 72 can encrypt the data in the user designated compression domain, processing proceeds to step S193. The codestream input unit 71 designates the encryption algorithm and commands the codestream encryptor 72 to perform the encryption function using the designated encryption algorithm. The codestream input unit 71 outputs the codestream to the codestream encryptor 72 to cause the codestream encryptor 72 to encrypt the codestream. The process content in step S193 is substantially identical to the process in steps S83 through S87 of FIG. 8.

If the codestream input unit 71 determines in step S192 that the codestream encryptor 72 has no encryption function for encrypting the data in the codestream designated by the user, processing proceeds to step S194 where the codestream input unit 71 determines whether function addition is possible. The determination of whether the function addition is possible is dependent on whether the apparatus (corresponding to the video compression encoding and video encrypting apparatus 251 of FIG. 25) is connectable to the tool server 254 through an Internet connection environment, and whether the apparatus has an account for logging into the tool server 254. If necessary, the apparatus may be connected to the tool server 254 in order to request that the tool server 254 deliver a corresponding program, and the codestream input unit 71 makes the determination in step S194 based on whether the apparatus receives the program. Alternatively, the codestream input unit 71 may make the determination in step S194 based on whether the program can be acquired from a removable disk or a hard disk. The present invention is not limited to the above-described methods of function addition. In the discussion that follows, it is assumed that the program for adding the function is acquired by downloading the program from the tool server 254. If the codestream input unit 71 determines that the function addition is not possible, the process ends. If the codestream input unit 71 determines that the function addition is possible, processing proceeds to step S195. In step S195, the program required for the encryption process is downloaded from the tool server 254 of FIG. 25, and is registered in the codestream encryptor 72. In step S193, the codestream input unit 71 designates the functional program that was registered and the encryption algorithm, thereby causing the codestream encryptor 72 to encrypt the codestream.

The function addition process in step S195 is described next with reference to the above-described first and second encryption methods. It is now assumed that the codestream encryptor 72 of FIG. 7 stores the function program for executing the second encryption method but not the function program for executing the first encryption method, and that the sign bit plane of the output from the quantizer is designated as the compression domain in step S191 (in other words, the execution of the first encryption method is designated).

As previously discussed, the first encryption method is executed in the arrangement of FIG. 9, and the second encryption method is executed in the arrangement of FIG. 11. By comparison of FIG. 9 with FIG. 11, the first encryption method (FIG. 9) can be constructed to be substantially identical in structure to the arrangement for the second encryption method (FIG. 11) by arranging an entropy decoder before the encrypted portion extractor 111, and an entropy encoder after the synthesizer 113.

In step S195 of FIG. 19, the codestream encryptor 72 receives programs for the entropy encoder and the entropy decoder from the tool server 254. In the second encryption process of the codestream encryptor 72, the entropy decoder is arranged before the encrypted portion extractor 111, and the entropy encoder is arranged after the synthesizer 113. The function addition is performed so that the second encryption process thus performs the same function as the first encryption process. When the encryption process is performed in the compression domain, a plurality of encryptions can be performed by combining a plurality of parts programs. This arrangement prevents the codestream encryptor 72 from increasing in size. Since the information to be downloaded from the tool server 254 is required parts programs, the amount of information is small, and time required to download the information is also short.

The codestream encryptor 72 with the function added thereto encrypts the codestream at the designated compression domain.

In exemplary embodiments, the blocks of FIGS. 9 and 11 are independent programs and inputs and outputs thereof are controlled by a predetermined rule. As shown, the programs, pipelined in the process order, perform the desired processes. It is now assumed that the programs represented by the encrypted portion extractor 111 to the adaptive processor 114 of FIG. 11 (hereinafter referred to as parts programs) are already present. An arrangement to determine that the entropy decoder 91 and the entropy encoder 95 are newly required to perform the function illustrated in FIG. 9 is described next with reference to FIG. 29.

Figure 29:
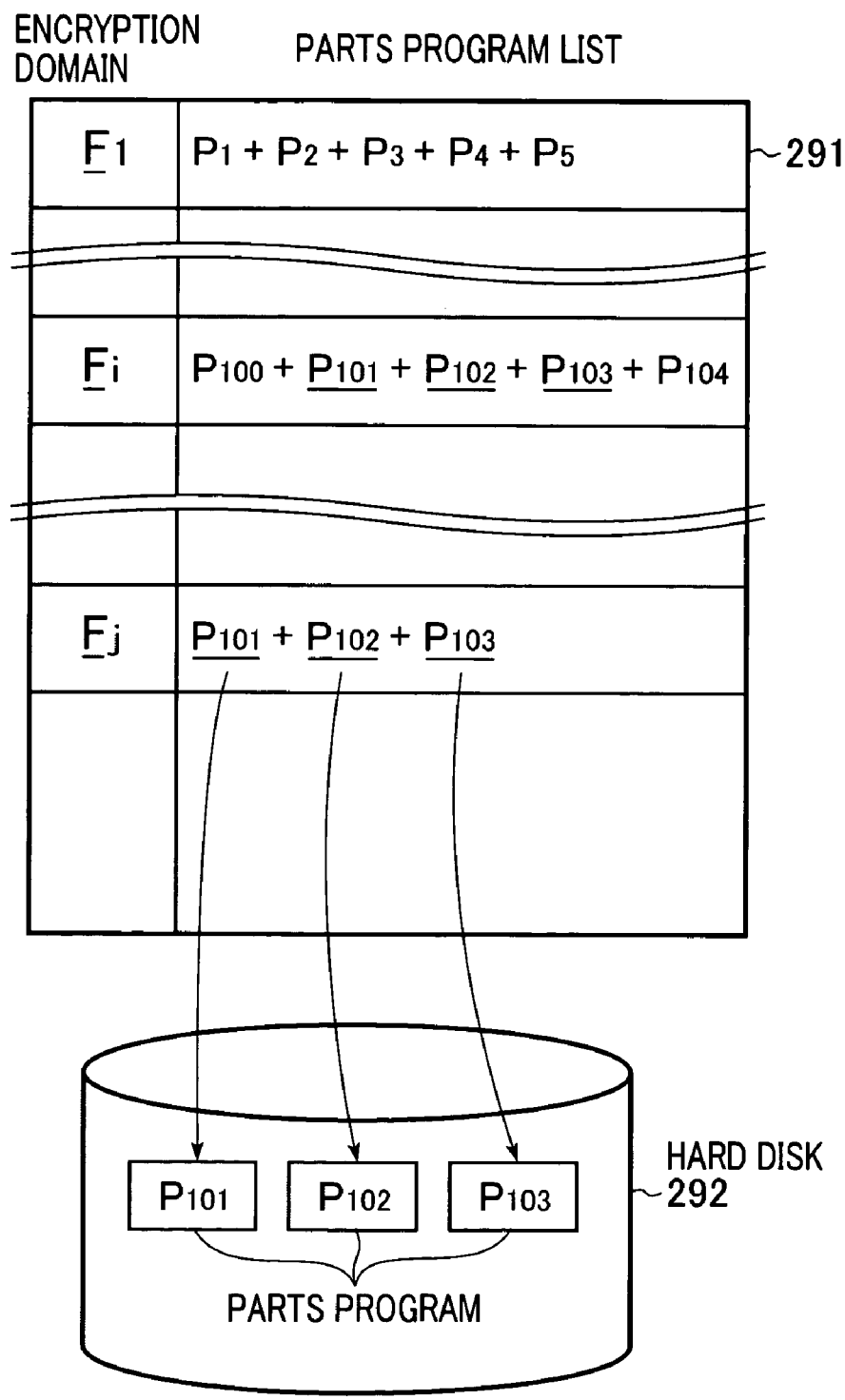
FIG. 29 illustrates the relationship between a table structure and a parts program for performing the encryption process of the exemplary embodiment of the present invention.

As shown in FIG. 29, an encryption program table 291 includes compression domains (F1, F2, . . . ) for encryption, and a parts program list indicating parts programs in use and the order of use thereof. The smaller the subscript number of the compression domains (F1, F2, . . . ), the earlier the encryption order of the domain. A parts program column, P1, P2, . . . respectively refers to file names. Underlined parts programs indicate that those parts programs are currently stored in a hard disk 292. Any parts program that is not underlined is not stored in the hard disk 292. Each parts program is a program related to entropy decoding, a dequantization program, a program for executing each step in the decompression process, or a program for executing each step in the compression process.

Referring to FIGS. 9 and 11, the compression domain Fj corresponds to the compression domain to be encrypted in FIG. 11, and the compression domain Fi corresponds to the compression domain of FIG. 9. If encryption is attempted at the compression domain Fi, non-underlined parts programs P100 and P104 are found to be absent. The parts programs P100 and P104 are downloaded from the tool server 254. When downloaded, the parts programs P100 and P104 are stored in the hard disk 292, and the parts program list is updated. As shown, the presence of a program is indicated by underlining. The present invention is not limited to this method. In exemplary embodiments, a parts program that is required to encrypt a compression domain and a table defining the process order of the parts program are arranged to determine the presence of any required parts program.

Figure 20:
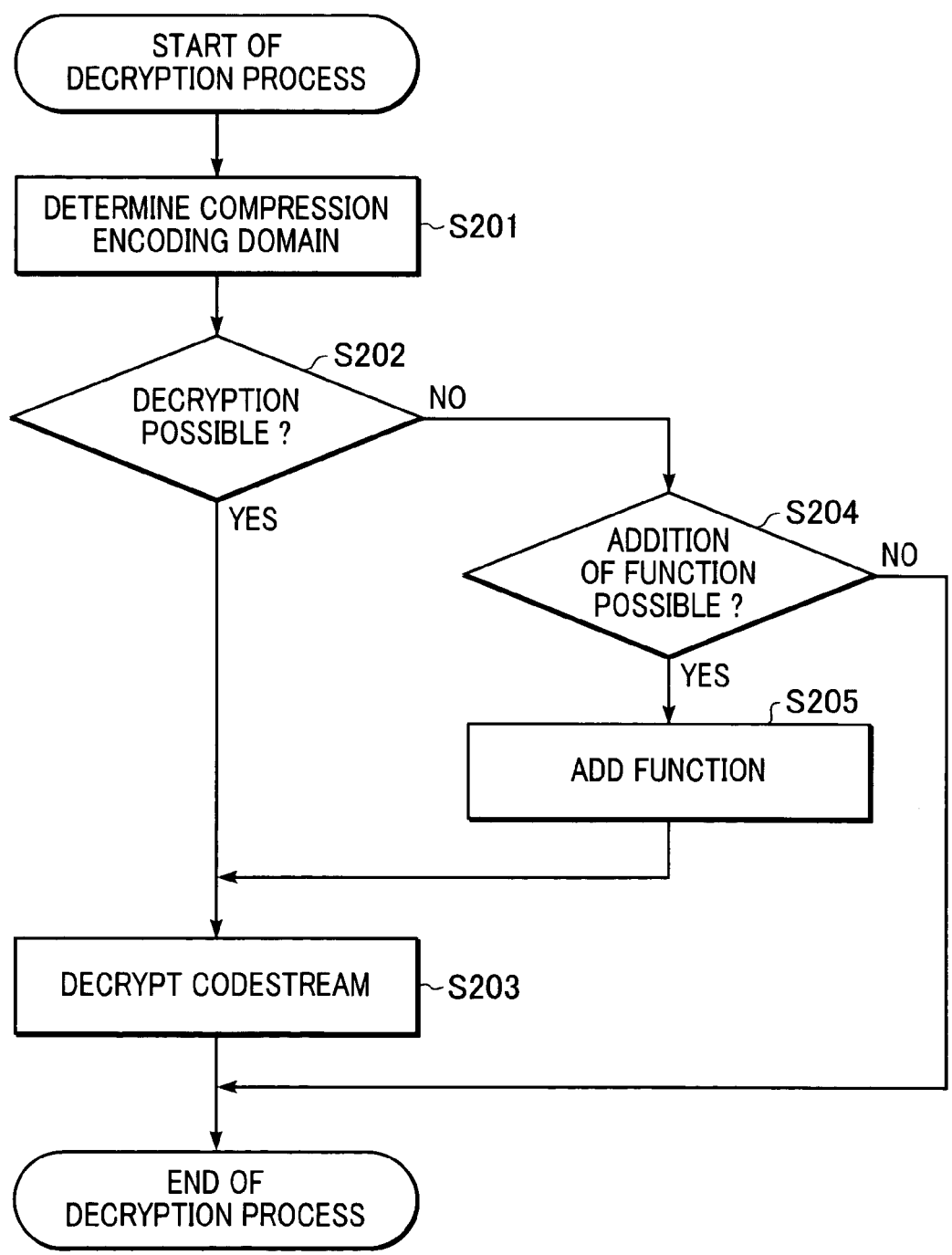
FIG. 20 is a flowchart of a modification of the decryption process in accordance with the exemplary embodiment of the present invention.

A modification of the decryption determination process is described next with reference to FIG. 20. FIG. 20 is a flowchart illustrating a modification of the decryption determination process performed in the encryption codestream input unit 141 of FIG. 14.

In step S201, the encryption codestream input unit 141 determines the compression domain to be subjected to the decryption process by examining predetermined data (main header) of the codestream.

In step S202, the encryption codestream input unit 141 determines whether the codestream decryptor 142 can decrypt the data in the designated compression domain.

To this end, the codestream decryptor 142 records beforehand the processing capability information P relating to the decryption process. The encryption codestream input unit 141 thus performs the determination process by receiving the information P relating to the decryption process from the codestream decryptor 142.

If the codestream decryptor 142 can decrypt the data in the designated compression domain, processing proceeds to step S203. The codestream decryptor 142 receives the information indicating the compression domain, the decryption algorithm, and the user designated key information required to decrypt the data from the encryption codestream input unit 141. The encryption codestream input unit 141 outputs the codestream to the codestream decryptor 142 to cause the codestream decryptor 142 to decrypt the codestream. The process in step S203 is substantially identical to the process in steps S153 through S157 of FIG. 15, and is therefore only briefly shown here.

If the encryption codestream input unit 141 determines that the current codestream decryptor 142 is unable to decrypt the input encrypted data, processing proceeds to step S204. The encryption codestream input unit 141 determines whether the addition of the function to the codestream decryptor 142 is possible. The function to be added may be received from the tool server 254 through the network, for example. In step S204, the codestream decryptor 142 may request that the tool server 254 send the program for the function. The tool server 254 determines whether a tool having the requested function can be delivered. If such a tool can be delivered, the tool server 254 delivers the tool to the codestream decryptor 142. If such a tool cannot be delivered, the tool server 254 notifies the codestream decryptor 142 that the delivery of the tool is impossible. Alternatively, the codestream decryptor 142 may acquire such a tool from a storage medium such as a removable disk or a hard disk. The present invention is not limited to any particular arrangement for adding the function. In the discussion that follows, it is assumed that the program to be added is acquired by downloading it from the tool server 254. If the codestream decryptor 142 is notified that the tool server 254 cannot deliver the tool program (i.e., the codestream input unit 141 determines in step S204 that the addition of the function is not possible), the decryption process ends. On the other hand, if the encryption codestream input unit 141 determines in step S204 that addition of the function is possible, the tool server 254 delivers the tool program to the codestream decryptor 142 and processing proceeds to step S205.

In step S205, the codestream decryptor 142 registers the function received from the tool server 254 and performs the decryption process in step S203.

The function addition process in step S205 is described next referencing the above-described first and second decryption methods. It is assumed that the codestream decryptor 142 of FIG. 14 stores only the program for the second decryption method (including a plurality of parts programs) and that the result of examination of the codestream C' in step S201 of FIG. 20 determines that the data in the sign bit plane of the output of the quantizer is encrypted in the compression domain (in other words, that the execution of the first decryption method is designated).

The first decryption method is performed as shown in FIG. 16. The second decryption method is performed as shown in FIG. 18. By comparison of FIG. 16 with FIG. 18, the arrangement for the second encryption method (FIG. 18) can be constructed to be substantially identical in structure to the arrangement of the first decryption method (FIG. 16) by arranging an entropy decoder before the encrypted portion extractor 181, and an entropy decoder after the synthesizer 183.

In step S204 of FIG. 20, the encryption codestream input unit 141 receives programs for the entropy encoder and the entropy decoder from the tool server 254. In the second encryption process of the codestream decryptor 142, the entropy decoder is arranged before the encrypted portion extractor 181, and the entropy encoder is arranged after the synthesizer 183. The function addition is performed so that the second decryption process performs the same function as the first decryption process.

The table of FIG. 29 is also used in the decryption process.

The codestream decryptor 142 with the function added thereto decrypts the data in the designated compression domain.

In the exemplary embodiment, the function to be added is received from the server through the network. The present invention is not limited to this arrangement. Alternatively, the program for the function may be acquired from a storage medium such as compact disc (CD), or digital versatile disc (DVD), or extracted from a module recorded in the codestream, or a combination thereof.

In the encryption process, one domain is selected from the plurality of compression domains to be encrypted. If the selected compression domain is encryptable, the encryption process is performed. If the selected compression domain is not encryptable, a function to enable encryption is added so that the encryption process is set to be in an executable state. In the decryption process, it is determined whether the encrypted data in any of the compression domains is decryptable. If it is determined that the encrypted data is decryptable, the decryption process is performed. If it is determined that the encrypted data is not decryptable, a function enabling decryption is added so that the decryption process is set to be in an executable state.

The present invention is not limited to this method. In the encryption process, two or more domains to be encrypted may be selected from among a plurality of compression domains, and the encryption process may be performed on two or more selected domains. The decryption process may be separately performed on the encrypted data in a plurality of compression domains in one modification of the exemplary embodiment described above. The modification is described next with reference to FIGS. 21 and 22.

Figure 21:
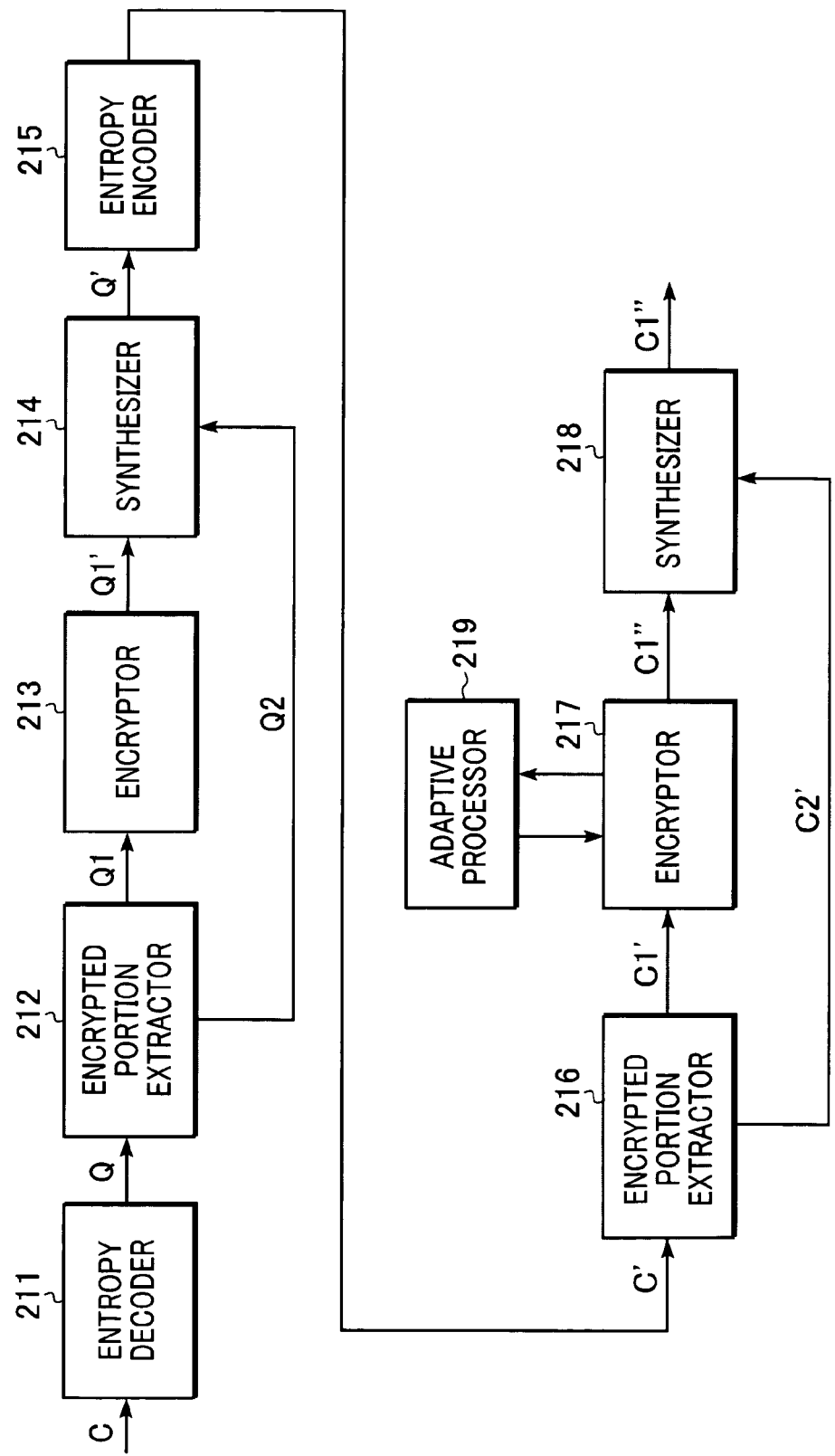
FIG. 21 illustrates a modification of the encryption process of the exemplary embodiment of the present invention.

FIG. 21 is a block diagram illustrating the modification of the encryptor of FIG. 7. As shown in FIG. 21, the encryption arrangement includes an entropy decoder 211, an encrypted portion extractor 212, an encryptor 213, a synthesizer 214, an entropy encoder 215, an encrypted portion extractor 216, an encryptor 217, a synthesizer 218, and an adaptive processor 219.

As shown in FIG. 21, the arrangement of FIG. 9 is linked to the arrangement of FIG. 11 so that the output of the encrypted result of the first encryption method (of FIG. 9) serves as an input to the second encryption method (of FIG. 11). In this arrangement, the encryption process is performed on both the sign bit plane of the output of the quantizer and the packet body of the output of the codestream output unit in the compression domain. The main header of the output codestream contains the encryption algorithms described at two encryption processed points. The encryption key information may or may not be the same at two points.

Figure 22:
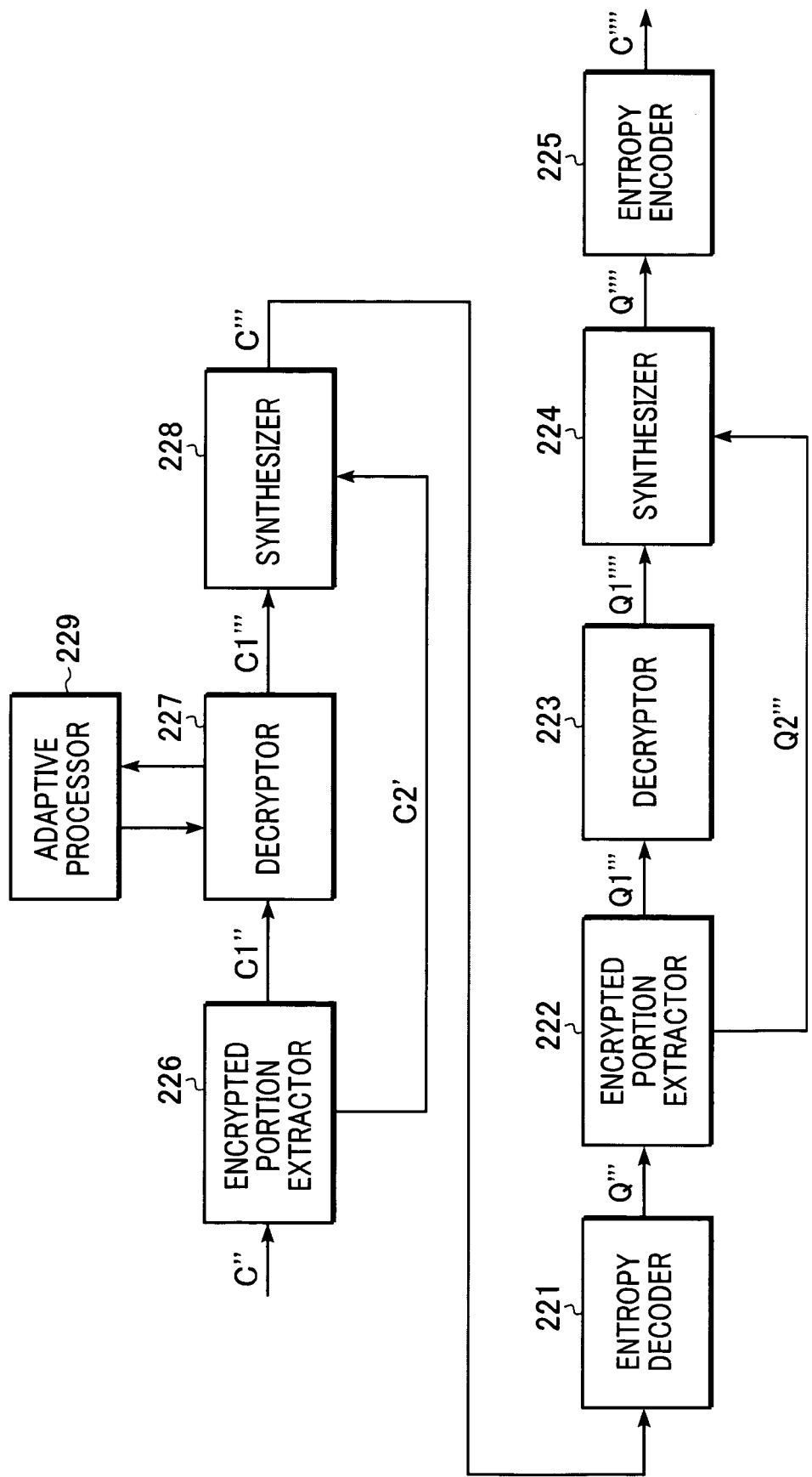
FIG. 22 illustrates a modification of the decryption process of the exemplary embodiment of the present invention.

A modification of the decryption process is described next with reference to FIG. 22. FIG. 22 is a block diagram illustrating the modification of the decryption process of FIG. 14.

As shown in FIG. 22, the arrangement of the decryption process includes an entropy decoder 221, an encrypted portion extractor 222, a decryptor 223, a synthesizer 224, an entropy encoder 225, an encrypted portion extractor 226, a decryptor 227, a synthesizer 228, and an adaptive processor 229.

As shown in FIG. 22, the output of the encrypted result of the decryption method (of FIG. 18) serves as an input to the first decryption method (of FIG. 16). This arrangement decrypts all data that is encrypted through the arrangement shown in FIG. 21. In other words, the decryption process is performed on both the sign bit plane of the output of the quantizer and the packet body of the output of the codestream output unit in the compression domain.

The data that is encrypted through the encryptor of FIG. 21 may be input to the decryptors of FIGS. 16 and 18 so that the encrypted data may be selectively decrypted.

In accordance with the exemplary embodiment, the encryption process and the decryption process are performed in the plurality of compression domains. The first encryption method and the first decryption method are performed to encrypt and decrypt the data in the sign bit plane of the output of the quantizer, and the second encryption method and the second decryption method are performed to encrypt and decrypt the data in the packet body of the output from the codestream output unit. The present invention is not limited to these arrangements. A plurality of encryption processes and a plurality of decryption processes may be combined to encrypt and decrypt the data in a variety of compression domains.

In the above-described exemplary embodiment, it is determined in the decryption process whether the decryption process is executable. If it is determined that the decryption process is not executable, the decryption process ends, or the function of the program for the decryption process is added. The present invention is not limited to this arrangement. If it is determined that the decryption process is not executable, the decryption operation may be transferred to a server over the network in a modification of the decryption process. Such a modification of the decryption process is described next with reference to FIG. 23.

Figure 23:
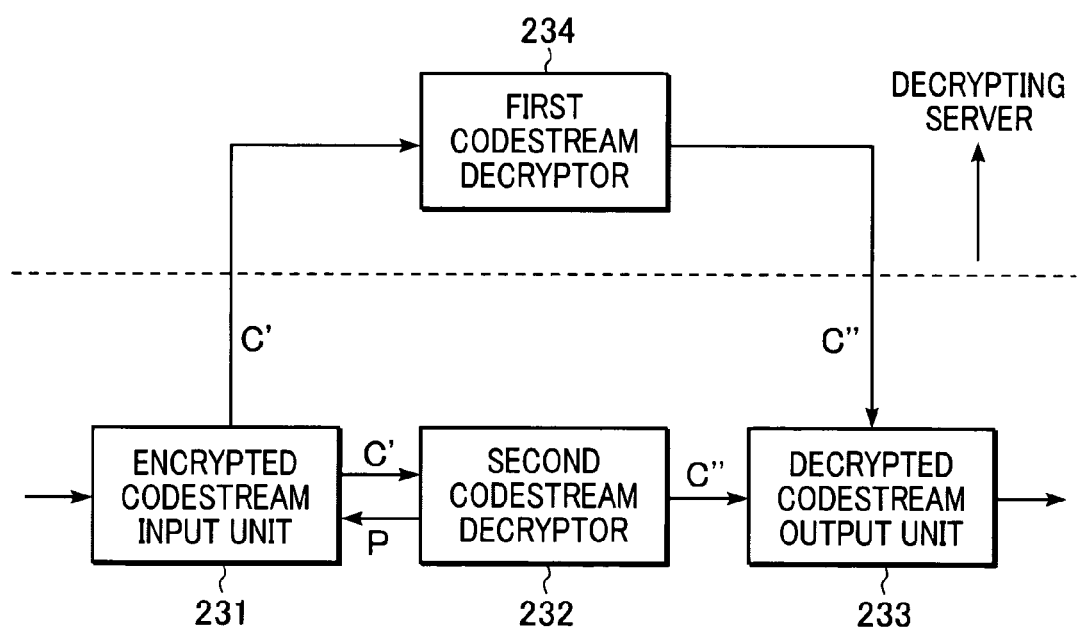
FIG. 23 illustrates another modification of the decryption process of the exemplary embodiment of the present invention.

FIG. 23 is a block diagram illustrating modification of the decryptor of FIG. 14.

As shown, the decryptor includes an encrypted codestream input unit 231, a first codestream decryptor 234, a second codestream decryptor 232, and a decrypted codestream output unit 233.

The codestream input unit 231 receives an encrypted codestream (from ROM324, RAM325, HD326, CD328, FD329, DVD3210, or NIC3215), examines a header contained in the codestream to extract a parameter required to perform a subsequent process, controls the flow of process if required, and sends the parameter to a subsequent process unit. The encrypted codestream input unit 231 receives the output from the encrypted codestream output unit 73 of FIG. 7.

The encrypted codestream input unit 231 determines the compression domain to perform the decryption process. As previously described, the encrypted codestream input unit 231 determines the compression domain by examining the input codestream and detecting the information relating to the compression domain attached to the codestream.

Furthermore, the encrypted codestream input unit 231 determines whether the second codestream decryptor 232 can perform the decryption process in the designated compression domain. In response to the result of this determination, the encrypted codestream input unit 231 outputs the input codestream C' to the first codestream decryptor 234 (the decryptor server 255) or the second codestream decryptor 232. The decryption key information is also sent. If the decryption key information is stored in a base server of the Internet, information relating to the address and file name of the decryption key information may be sent to the first codestream decryptor 234 as the decryptor server 255.

The first codestream decryptor 234 and the second codestream decryptor 232 receive the input encrypted codestream C', perform the first decryption process and the second decryption process, thereby outputting the decrypted codestream C". Alternatively, the codestream C' may be sent from the encrypted codestream input unit 231 to the first codestream decryptor 234 through the network so that the first codestream decryptor 234 decrypts the codestream C' in a remote computer. Alternatively, the codestream C' may be input from the encrypted codestream input unit 231 to the first codestream decryptor 234 to allow a local computer to decrypt the codestream C' separately from the first codestream decryptor 234.

The decrypted codestream C", from the second codestream decryptor 232 or from the first codestream decryptor 234, is output from the decrypted codestream output unit 233. For example, the decrypted codestream output unit 233 outputs, to a destination, the codestream as a file name designated in output box 262 as shown in FIG. 26. The codestream output unit 233 may be a drive for writing the codestream to a storage medium (such as RAM325, HD326, CD-328, or FD329), or a network interface (3215) for communicating the codestream via a network.

Figure 24:
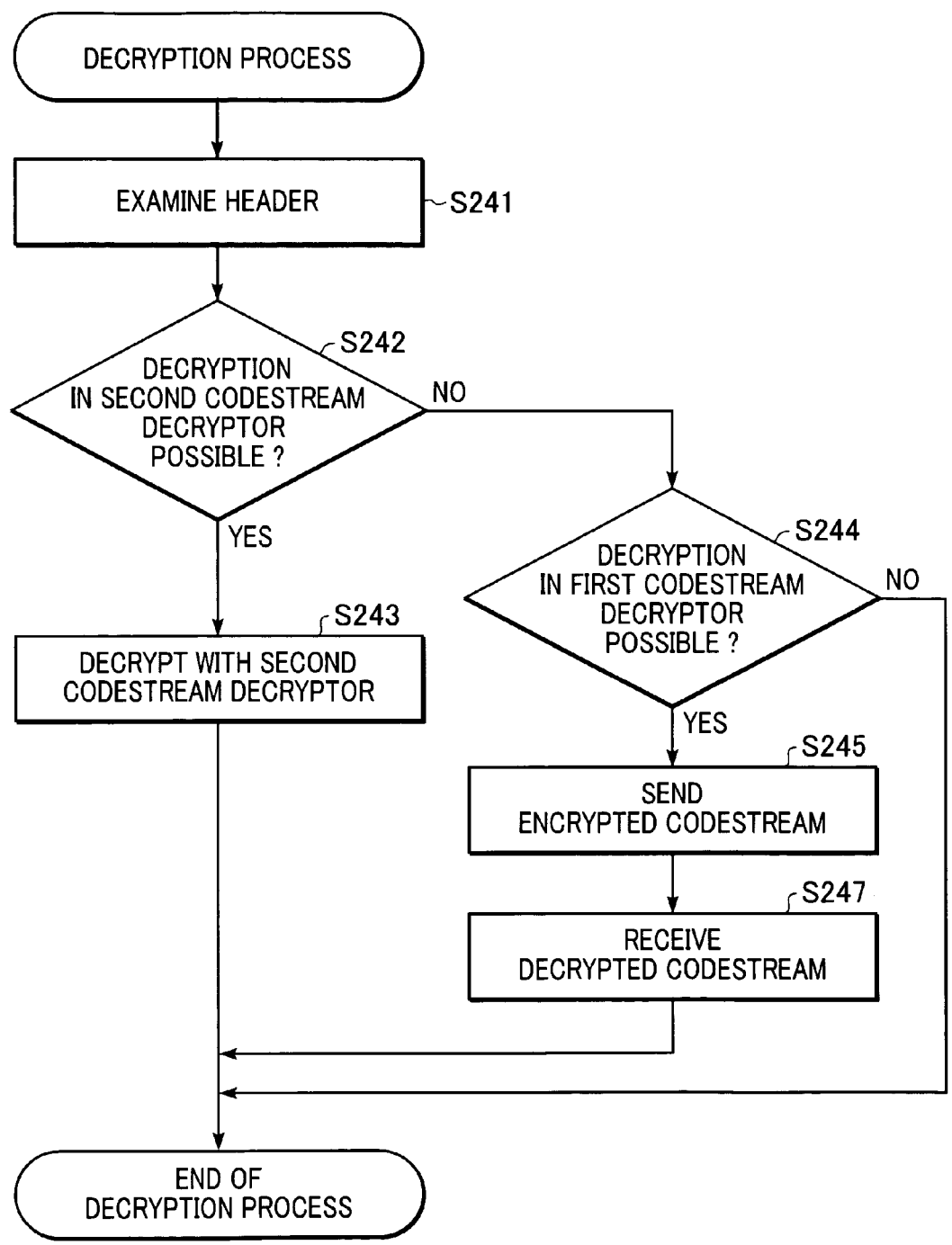
FIG. 24 is a flowchart of the decryption process of FIG. 23.

The flow of the process of the above-described modification is described next with reference to FIG. 24.

In step S241, the encrypted codestream input unit 231 detects the information relating to the decrypted compression domain attached to the codestream. In step S242, the encrypted codestream input unit 231 determines whether the second codestream decryptor 232 (the codestream decryptor 142) can perform the decryption process in the designated compression domain. If it is determined that the decryption process is executable, processing proceeds to step S243 to execute the decryption process. In step S243, the second codestream decryptor 232 executes the second decryption process. If it is determined that the decryption process is not executable, processing proceeds from step S242 to step S244.

In step S244, the encrypted codestream input unit 231 determines whether the first codestream decryptor 234 can execute the first decryption process. If it is determined that the first decryption process is not executable, the decryption process ends. However, if it is determined that the first decryption process is executable, processing proceeds to step S245.

In step S245, the encrypted codestream and the decryption key information are sent from the encrypted codestream input unit 231 to the first codestream decryptor 234 through the network. The external server decrypts the codestream. In step S247, the decrypted codestream is received. When the codestream C' is sent to the external server (first codestream decryptor 234) via the Internet or when the decrypted codestream C" is sent from the external server to the apparatus via the Internet, there is a possibility that the data may be wiretapped by a third party. A predetermined encryption process may be performed between the apparatus and the external server.

In this way, if a local machine has difficulty with the decryption process, the operation of the decryption process may be transferred to the server connected to the network.

When the codestream encrypted through the first encryption process is input, the second decryptor installed in the local computer cannot decrypt the encrypted codestream. The encrypted codestream is sent to the remote computer. The remote computer performs the first decryption process, and sends the decrypted codestream to the local computer.

In accordance with the modification of the decryption process, it is determined in step S242 whether the local computer can decrypt the codestream processed by the first encryptor (the encrypted codestream of the output of the quantizer). If it is determined that the local computer cannot decrypt the codestream, the operation of the decryption process is transferred to the server. The present invention is not limited to this arrangement. Alternatively, it is determined in step S242 whether the local computer can decrypt the codestream encrypted using a predetermined encryption system of the local computer (such as AES). If it is determined that the local computer is unable to decrypt (using AES), the operation of the decryption process is transferred to the server.

In accordance with the exemplary embodiment, any of the decryptors can be installed in the local computer. The present invention is not limited to this arrangement. For example, there may be no decryptors installed in the local computer and all decryptors may be left to the responsibility to the external server.

In the above-described exemplary embodiment, the compressed data is input, the input compressed data is subjected to the encryption process or the decryption process, and the encrypted compressed data or the decrypted compressed data is output.

The present invention is not limited to this arrangement. Non-compressed video data may be input in the encryption process, and the input video data may be compressed while the video data may be encrypted in any of the compression domains. Compressed and encrypted data may thus be output. The processing capability information P relating to the encryption process is not limited to the capability of processing the output from the codestream output unit in the final compression domain, and a variety of processing capabilities may be set as previously described. In accordance with the exemplary embodiment, the video data may be fully compressed, but the processing capability P changes depending on whether or not an interface acquiring data in the compression domain is arranged.

In the decryption process, the encrypted video data is input, and the input video data is decompressed while being decrypted in any of the compression domains. The decompressed data is then output as video data. In such an arrangement, the processing capability P relating to the decryption process is not limited to the capability of processing the output from the video data output unit in the final domain of the compression domains. As already described, a variety of processing capabilities may be set. In accordance with the exemplary embodiment, the video data may be fully decompressed, but the processing capability P changes depending on whether or not an interface acquiring data in the compression domain is arranged.

Figure 27:
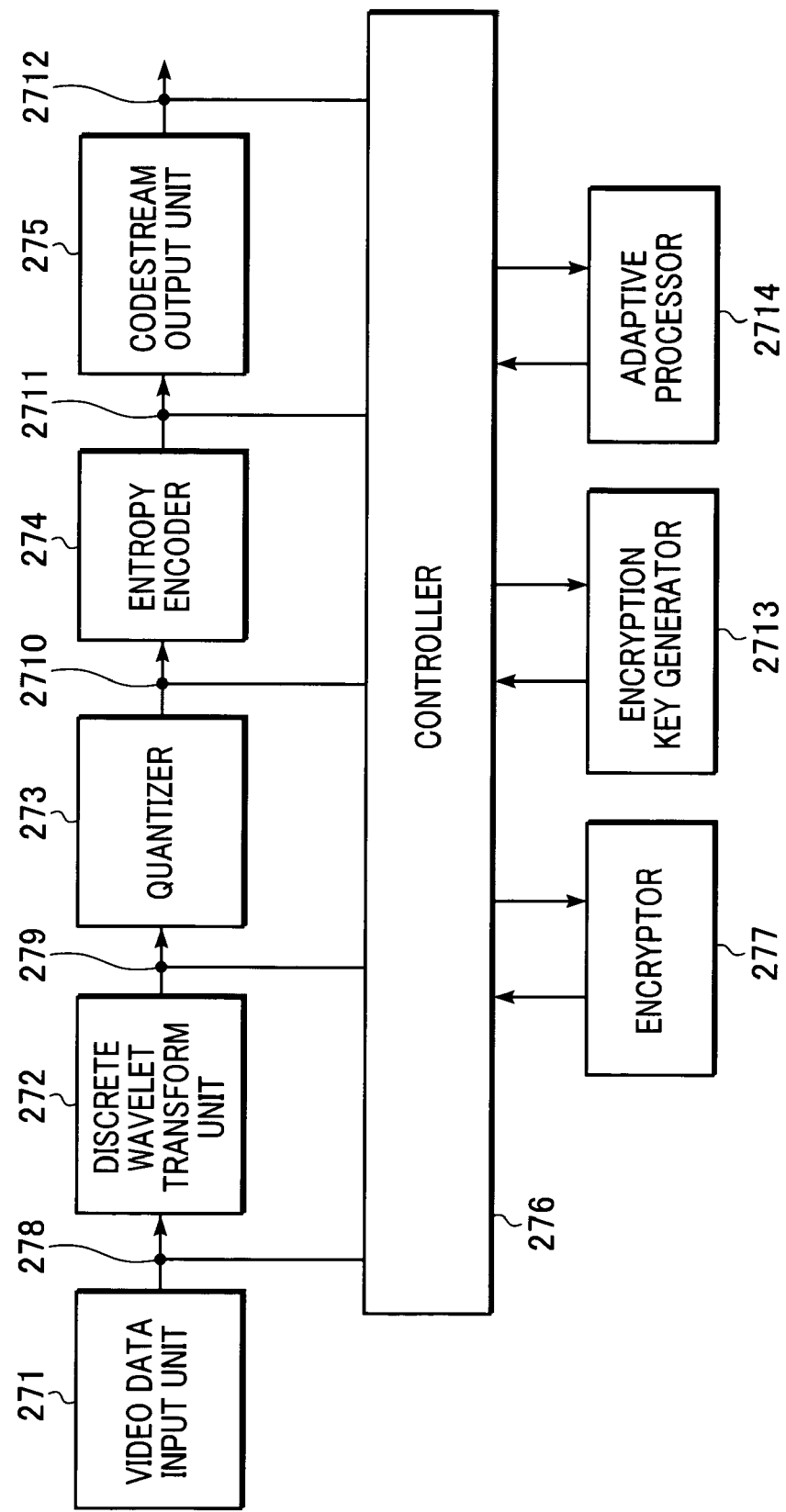
FIG. 27 is a block diagram of a video compressor and encryptor as a modification of the exemplary embodiment of the present invention.
Figure 28:
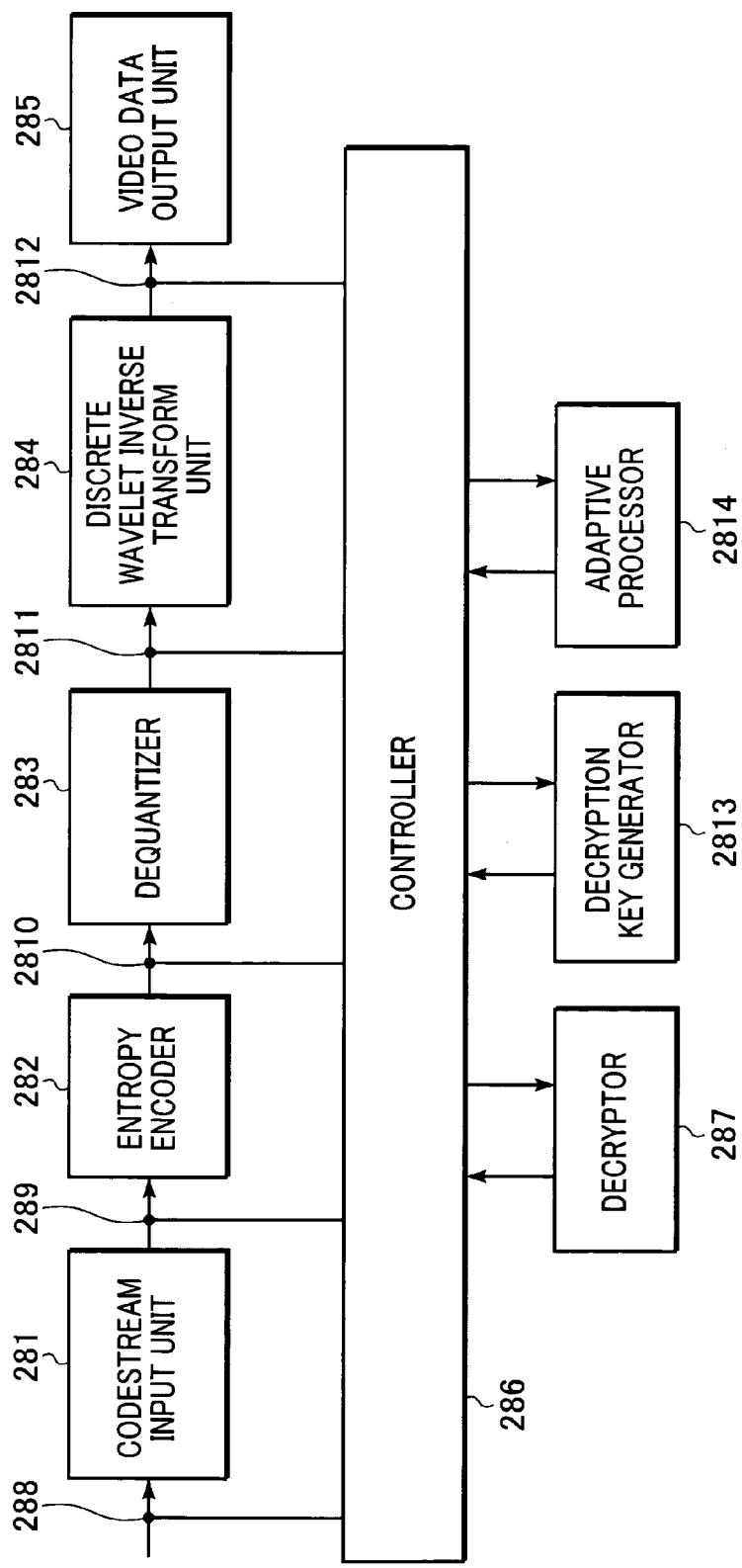
FIG. 28 is a block diagram of a video compressor and encryptor as another modification of the exemplary embodiment of the present invention.

To implement the above-described schemes, the encryption processing apparatus and the decryption processing apparatus may have the structures of FIGS. 27 and 28, respectively.

The encryption processing apparatus is now discussed with reference to FIG. 27. FIG. 27 is a block diagram illustrating the structure of the encryption processing apparatus that concurrently performs the compression process and the encryption process.

As shown, the encryption processing apparatus includes a video data input unit 271, a discrete wavelet transform unit 272, a quantizer 273, an entropy encoder 274, and a codestream output unit 275, which are respectively identical in operation to the video data input unit 11, the discrete wavelet transform unit 12, the quantizer 13, the entropy encoder 14, and the codestream output unit 15 shown in FIG. 1, and the discussion of these components is omitted here. An encryptor 277 is identical in operation to the encryptor 93 of FIG. 9, and the discussion thereof is omitted here.

A controller 276 receives data from one of interfaces 278, 279, 2710, 2711, and 2712 in response to the compression domain designated in the encoding (compression) domain box 265 of FIG. 26. In the encryption process, the controller 276 encrypts the data in the input compression domain using the encryptor 277 and returns the encrypted data to any of the interfaces 278, 279, 2710, 2711, and 2712.

The typical compression process is performed by the video data input unit 271 (from ROM324, RAM325, HD326, CD328, FD329, DVD3210, or NIC3215), the discrete wavelet transform unit 272, the quantizer 273, the entropy encoder 274 (using CPU323), and the codestream output unit 275 (to RAM325, HD326, CD328, FD329, NIC3215) in that order. The result of the output of the unit corresponding to the compression domain designated in FIG. 26 may be acquired and encrypted in an interrupted manner, and the encrypted data is output to a unit downstream of the interrupted point. The encryption process is thus performed at a desired compression domain.

Figure 8:
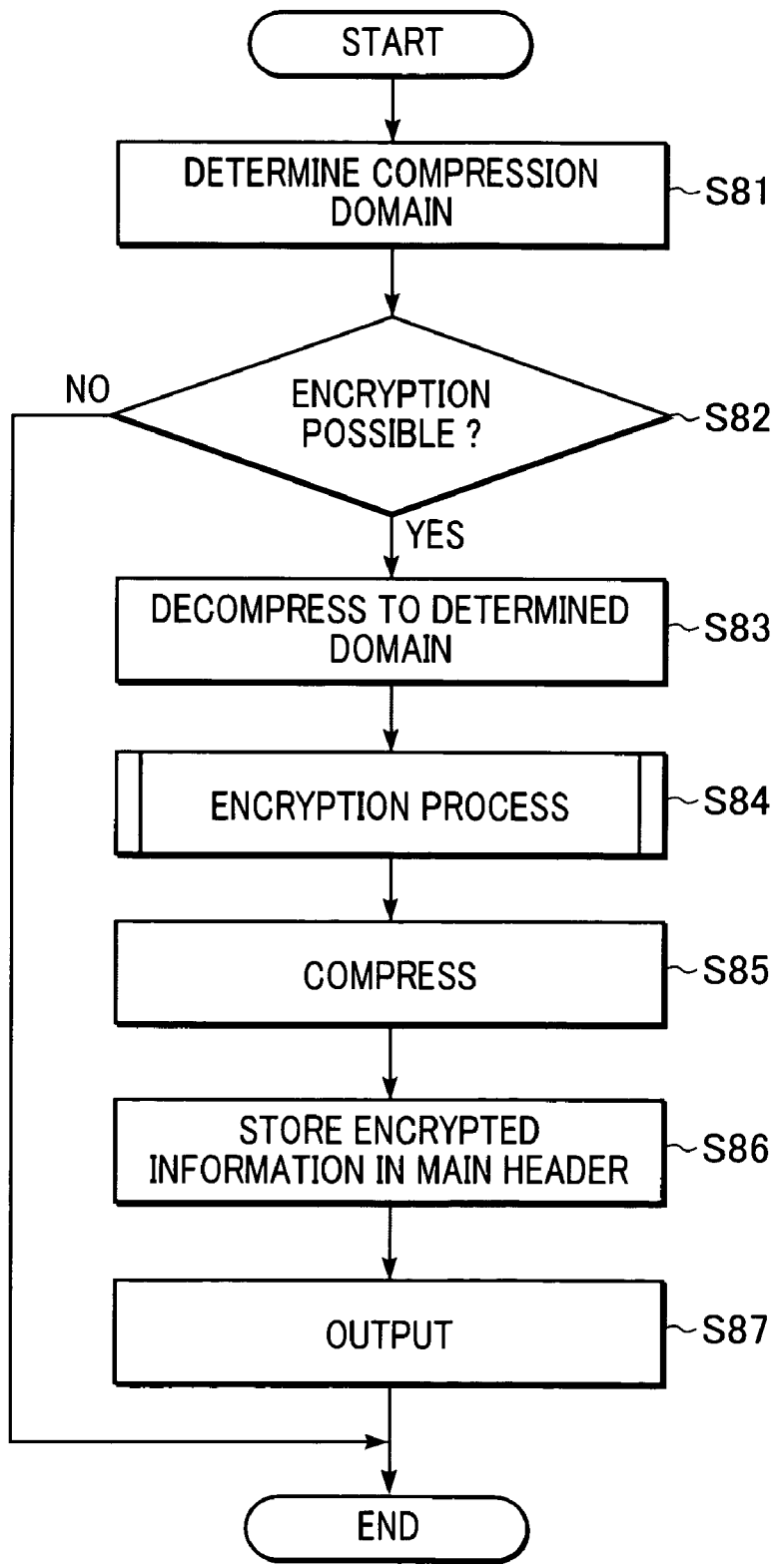
FIG. 8 is a flowchart of an encryption process of the exemplary embodiment of the present invention.

In accordance with the exemplary embodiment, the interfaces 278, 279, 2710, 2711, and 2712 are not necessarily installed. The processing capability P relating to the encryption process may be set depending on the interfaces arranged in the encryption processing apparatus. The process may end as shown in the process of FIG. 8, or the function may be added as shown in FIG. 19.

The encryptor 277 may use the encryption key generator 2713 to generate an encryption key for use in the encryption process. The controller 276 produces the encryption key using the encryption key generator 2713 as necessary, and performs the encryption process in the encryptor 277 using the generated key. When the encryption process is performed by picking up the data from the interface 2712 serving as the output of the codestream output unit 275, the adaptive processor 2714 for causing the encrypted data to be compatible with JPEG2000 may be used. In this case, the controller 276 uses the adaptive processor 2714 in addition to the encryptor 277 to perform the encryption process to the data from the interface 2712.

Figure 30:
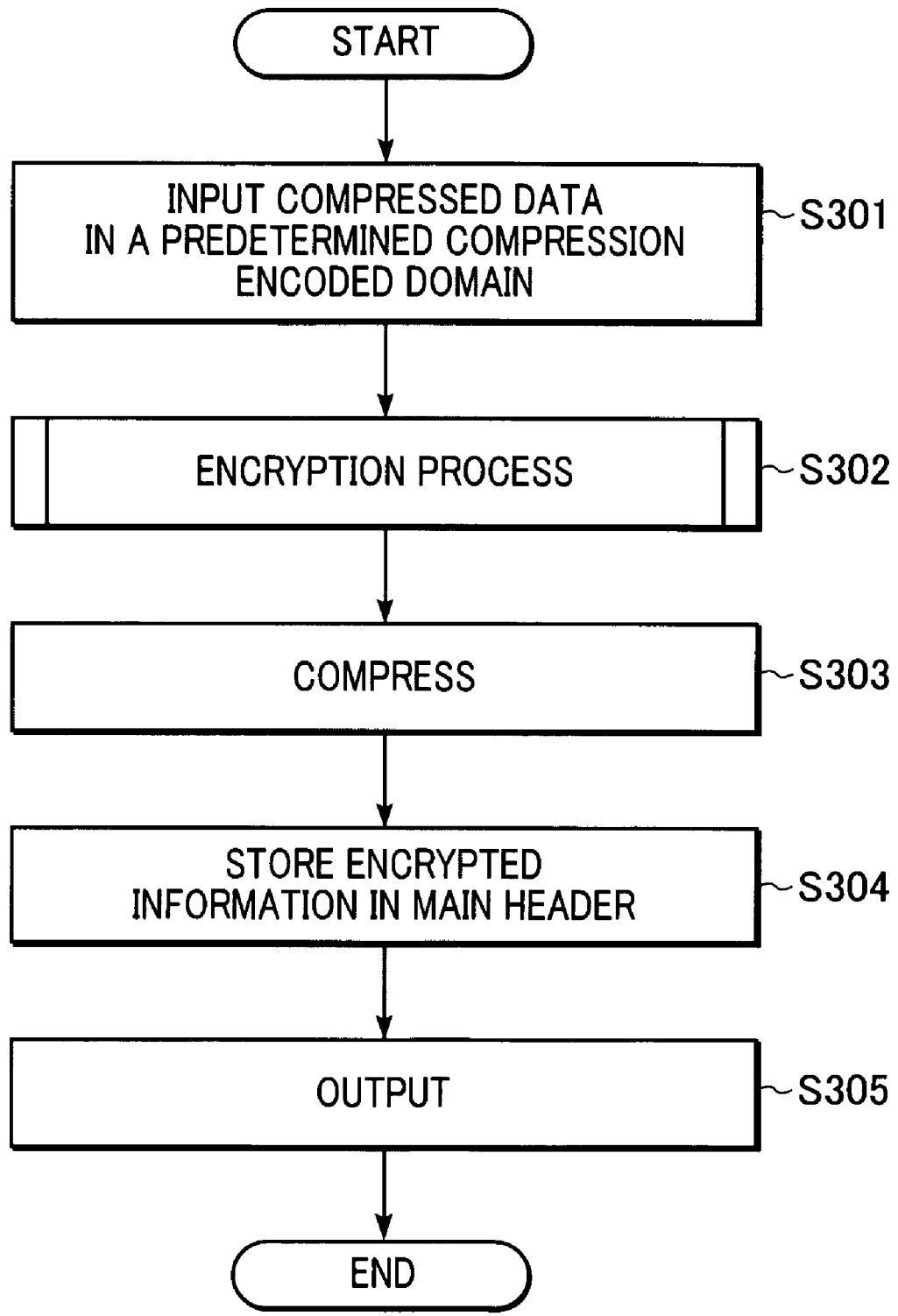
FIG. 30 is a flowchart illustrating the encryption process of the exemplary embodiment of the present invention.

It is not necessary that the controller 276 acquire all data from all interfaces. The controller 276 may acquire part of the output data. For example, the controller 276 may acquire only the sign bit plane of the output of the quantizer 273 from the interface 2710, or may acquire only the packet body of the output from the codestream output unit 275 from the interface 2712. The flow of the above-described encryption process is described next with reference to FIG. 30. FIG. 30 is a flowchart illustrating the encryption process implemented in the exemplary embodiment.

In step S301, compressed video data that is compressed in a predetermined compression domain of a compression process is input. In step S302, the encryption process is performed in accordance with the encryption algorithm designated by the user. After encryption, the compression process subsequent to the predetermined compression domain is performed in step S303. After the compressed data has been produced, information of the encryption process as shown in FIG. 13 relating to the compression domain is stored in the main header in step S304. In step S305, the information is output as the codestream.

The structure and content of the decryption processing apparatus is described next with reference to FIG. 28.

As shown, the decryption processing apparatus includes a codestream input unit 281 (from ROM324, RAM325, HD326, CD328, FD329, DVD3210, or NIC3215), an entropy encoder 282, a dequantizer 283, an inverse discrete wavelet transform unit 284 (using CPU323), and a video data output unit 285 (to RAM325, HD326, CD328, FD329, NIC3215), which are respectively identical in operation to the codestream input unit 41, the entropy decoder 42, the dequantizer 43, the inverse discrete wavelet transform unit 44, and the video data output unit 45 of FIG. 4, and the description of the operation thereof is omitted here. A decryptor 287 is identical in operation to the decryptor 163 of FIG. 16, and the description thereof is omitted here.

A controller 286 receives intermediate data in a compression domain from any of interfaces 288, 289, 2810, 2811, and 2812 in accordance with the information relating to the compression domain extracted from the codestream, and causes the decryptor 287 to perform the decryption process on the intermediate data in the compression domain, and returns the decrypted data to any of the interfaces 288, 289, 2810, 2811, and 2812.

The controller 286 performs a subsequent process in subsequent units, thereby outputting decrypted video data.

All of the interfaces 288, 298, 2810, 2811, and 2812 are not necessarily used in accordance with the exemplary embodiment. Depending on the interfaces arranged for the decryption process, the process may end as shown in FIG. 15, and the function may added as shown in FIG. 20.

The decryptor 287 may use the decryption key generator 2813 to generate a decryption key for use in the decryption process. The controller 286 produces the decryption key using the decryption key generator 2813 as necessary, and performs the decryption process in the decryptor 287 using the generated key. The decryption process may be performed by picking up the data from the interface 288, for example. Since the encryptor 277 and adaptive processor 2714 perform the encryption process as shown in FIG. 27, the controller 286 uses the adaptive processor 2814 in addition to the decryptor 287 to decrypt the data from the interface 288.

It is not necessary that the controller 286 acquire all data from all interfaces. The controller 286 may acquire part of the output data. For example, the controller 286 may acquire only the sign bit plane of the output of the quantizer from the interface 2710, or may acquire only the packet body of the output from the codestream output unit from the interface 288.

Figure 31:
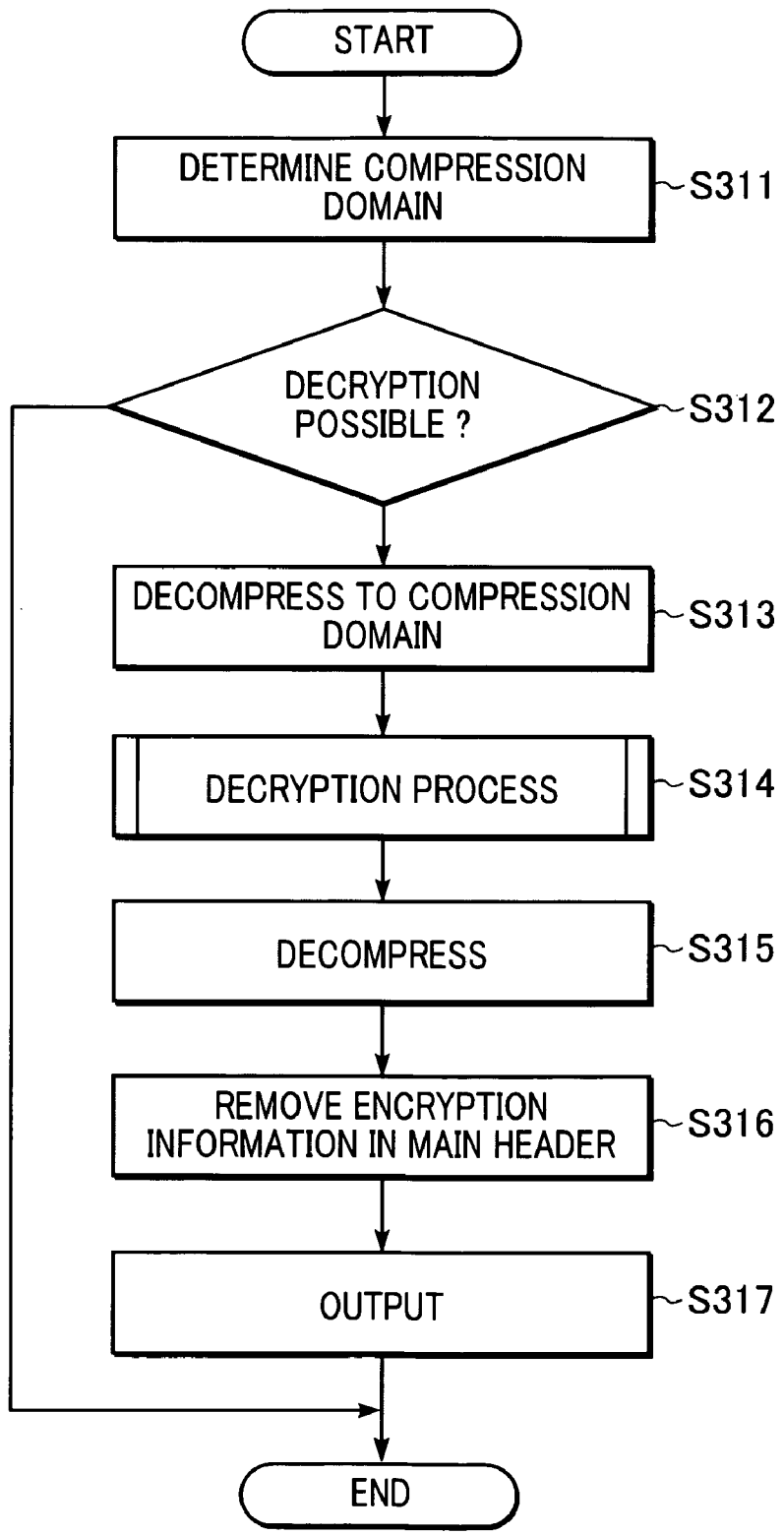
FIG. 31 is a flowchart illustrating the decryption process of the exemplary embodiment of the present invention.

The flow of the above-described decryption process is described next with reference to FIG. 31. FIG. 31 is a flowchart illustrating the decryption process implementing the exemplary embodiment.

In step S311, the encryption information (the compression domain in which the encryption process has been performed, and the encryption algorithm) is read and the encrypted compression domain is determined. Then, in step S312, it is determined whether or not the input data can be decrypted. If it is impossible to decrypt the designated compression domain, the decryption process ends. On the other hand if decryption is possible, processing proceeds to step S313. The compressed data is decompressed until the encrypted compression domain. In step S314, the decryption process is performed. In step S315, the decompression process subsequent to the encrypted compression domain is performed. In step S316, a main header with the encryption information removed in the codestream is generated. In step S317, a decrypted stream is output.

Exemplary embodiments of the present invention have been described. As previously discussed, the apparatus for encrypting and decrypting the video data may be a general purpose information processing apparatus such as a personal computer and a computer program running on the computer.

Figure 32:
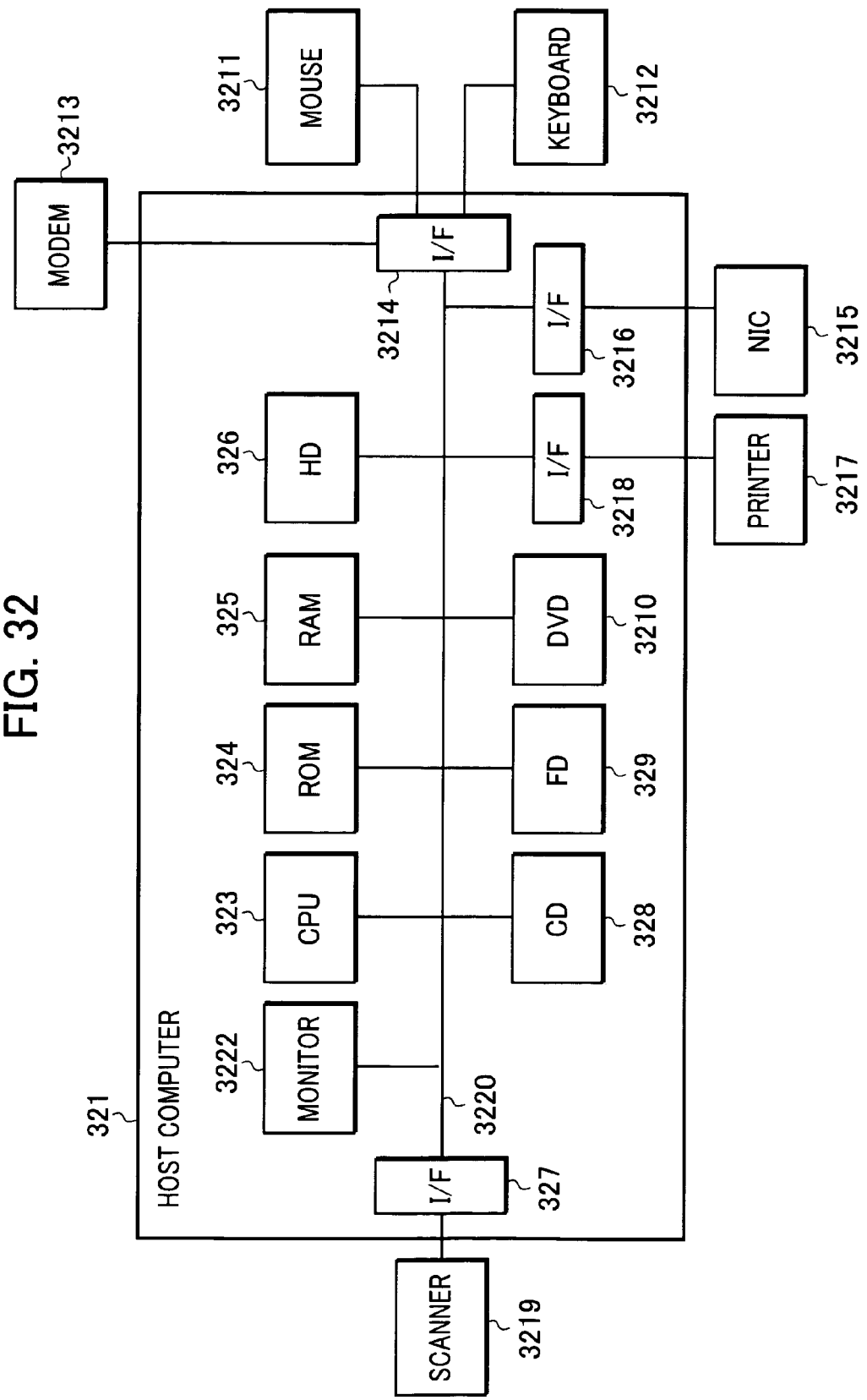
FIG. 32 is a block diagram illustrating a host computer which can apply to the exemplary embodiment of the present invention.

Referring FIG. 32, a host computer 321 implementing the exemplary embodiment of the present invention is described next. FIG. 32 illustrates the basic structure of the host computer 321 that functions as the video processing apparatus of the exemplary embodiment and the connection of the host computer 321 with peripheral devices thereof. The host computer 321 may be a widely used personal computer, and stores and edits images captured by a scanner 3219 and input through an interface 327. The host computer 321 also causes a printer 3217 to print out the captured images. A user inputs various instructions using a mouse 3211 and/or keyboard 3212. The internal blocks in the host computer 321 are interconnected to each other via a bus 3220, thereby exchanging a variety of data.

A monitor 3222 displays a variety of information from the host computer 321.

A CPU 323 controls the operation of each block in the host computer 321, and executes programs stored onto RAM325. An ROM 324 stores BIOS and boot programs. An RAM 115 temporarily stores programs and video data to be processed, and OS or programs the CPU 323 executes to perform various processes to be discussed later.

A hard disk (HD) 326 stores the OS or program to be transferred to the RAM, etc., and stores video data thereto and allows video data to be read therefrom while the apparatus operates. A CD-ROM drive 328 writes data to or reads data from a CD-ROM (CD-R) as one of the external storage media.

As the CD-ROM 328 drive, a floppy drive 329 reads data from and/or writes data to an FD (floppy disk). As the CD-ROM drive 328, a DVD-ROM drive 3210 writes data to and/or reads data from a DVD-ROM. If any of the CD-ROM, FD, and DVD-ROM stores video editing programs, these programs are installed onto the HD 326, and transferred to the RAM 325 as necessary.

An interface (I/F) 327 connects the scanner 3219 to the bus 3220, thereby outputting video data input from the scanner 3219 to the HD 326 and RAM 325.

An interface (I/F) 3218 connects the printer 3217 to the host computer 321. The printer 3217 prints out video data and/or text data, stored in the RAM 325, the HD 326, the CD-ROM 328, the FD drive 329, or the DVD-ROM 3210, onto a recording medium such as sheets of paper or OHP. The host computer 321 transfers print data to the printer 3217 via the interface 3218.

An interface 3214 connects the mouse 3211 and the keyboard 3212 to the host computer 321. A variety of instructions input by the mouse 3211 and/or the keyboard 3212 are input to the CPU 323 via the interface 3214.

The computer program is typically stored in a computer readable storage medium such as a compact disc read-only memory (CD-ROM328). The computer program may be executed by loading the computer readable storage medium in a drive of the computer, and copying or installing the computer program onto the computer.

In exemplary embodiments, intermediate data in the desired domain in the codestream that is encoded through a plurality of steps in accordance with JPEG2000, for example, is encrypted. Since information indicating the domain used for encryption has been performed is recorded in a predetermined area (e.g., the main header), the decryption process is performed at the appropriate domain.

The encryption process may be set at any compression domain in the encoding (compression) process such as JPEG2000 using the wavelet transform. The encrypted data stream or data is identical in structure to the compressed unencrypted data.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image encrypting method comprising steps of:
    (a) inputting compressed image data which has been compressed using a wavelet conversion;
    (b) designating, from among a plurality of compression domains of a compression process, one of the plurality of compression domains, wherein each of the plurality of compression domains corresponds to a codestream, entropy-encoded data, quantized data, discrete-wavelet data, and original image data, respectively;
    (c) generating decompressed image data by decompressing the compressed image data back to data corresponding to the designated compression domain of the compression process;
    (d) generating decompressed encrypted image data by encrypting the decompressed image data;
    (e) generating compressed encrypted image data by compressing the decompressed encrypted image data by executing processes following on a process corresponding to the designated compression domain; and
    (f) storing information representing the designated compression domain in a predetermined area of the compressed encrypted image data.

2. The image encrypting method according to claim 1, wherein step (b) comprises designating a portion of the compressed image data, which is to be encrypted, and wherein step (d) comprises encrypting a portion of the decompressed image data generated in step (c) corresponding to the designated portion of the compressed image data.

3. A memory medium storing, in computer readable manner, a computer program for causing a computer to execute the steps of the image encrypting method according claim 1.

4. An image encrypting apparatus comprising:
    an input unit configured to input compressed image data which has been compressed using a wavelet conversion;

a designating apparatus configured to designate, from among a plurality of compression domains of a compression process, one of the plurality of compression domains, wherein each of the plurality of compression domains corresponds to a codestream, entropy-encoded data, quantized data, discrete-wavelet data, and original image data, respectively;

a decompressor configured to generate decompressed image data by decompressing the compressed image data back to data corresponding to the designated compression domain of the compression process;

an encryptor configured to generate encrypted decompressed image data by encrypting the decompressed image data;

a compressor configured to generate compressed encrypted image data by compressing the decompressed encrypted image data by executing processes following on a process corresponding to the designated compression domain; and an output unit configured to store information representing the designated compression domain in a predetermined area of the compressed encrypted image data.

5. An image decrypting method comprising steps of:

inputting compressed encrypted image data, the compressed encrypted image data having been compressed using a wavelet conversion;

determining which of a plurality of compression domains of a compression process has been used to encrypt image data to obtain the compressed encrypted image data, by examining a predetermined area of the compressed encrypted image data, wherein each of the plurality of compression domains corresponds to a codestream, entropy-encoded data, quantized data, discrete-wavelet data, and original image data, respectively;

generating decompressed encrypted image data by decompressing the compressed encrypted image data back to data corresponding to the determined compression domain;

generating decompressed decrypted image data by decrypting the decompressed encrypted image data; and generating compressed decrypted image data by executing processes following on a process corresponding to the determined compression domain.

6. A memory storing medium storing, in a computer readable manner, a computer program for causing a computer to execute the steps of the image encrypting method according claim 5.

7. An image decrypting apparatus comprising:

an input unit configured to input compressed encrypted image data, the compressed encrypted image data having been compressed using a wavelet conversion;

a determination unit configured to determine which of a plurality of compression domains of a compression process has been used to encrypt image data to obtain the compressed encrypted image data, by examining a predetermined area of the compressed encrypted image data, wherein each of the plurality of compression domains corresponds to a codestream, entropy-encoded data, quantized data, discrete-wavelet data, and original image data, respectively;

a decompressor configured to generate decompressed encrypted image data by decompressing the compressed encrypted image data back to data corresponding to the determined compression domain;

a decryptor configured to generate decompressed decrypted image data by decrypting the decompressed encrypted image data; and a compressor configured to generate compressed decrypted image data by executing processes following on a process corresponding to the determined compression domain.

* * * * *